(12) United States Patent
Kakiuchi et al.

(10) Patent No.: US 7,359,310 B2
(45) Date of Patent: Apr. 15, 2008

(54) OPTICAL RECORDING MEDIUM

(75) Inventors: Hironori Kakiuchi, Tokyo (JP); Hiroyasu Inoue, Tokyo (JP)

(73) Assignee: TDK Corporation, Tokyo (JP)

( * ) Notice: Subject to any disclaimer, the term of this patent is extended or adjusted under 35 U.S.C. 154(b) by 642 days.

(21) Appl. No.: 10/792,083

(22) Filed: Mar. 3, 2004

(65) Prior Publication Data
US 2004/0174804 A1 Sep. 9, 2004

(30) Foreign Application Priority Data
Mar. 4, 2003 (JP) ............................. 2003-057206

(51) Int. Cl.
*G11B 7/24* (2006.01)

(52) U.S. Cl. ................ 369/275.2; 369/94; 430/270.12; 428/64.4

(58) Field of Classification Search ............ 369/275.2, 369/275.1, 275.3, 275.4, 275.5, 94, 59.11; 428/64.2, 64.5, 64.4; 430/270.12, 270.13
See application file for complete search history.

(56) References Cited

U.S. PATENT DOCUMENTS

| | | | | |
|---|---|---|---|---|
| 5,458,941 | A * | 10/1995 | Hintz | 428/64.4 |
| 6,245,404 | B1 * | 6/2001 | Saito et al. | 428/64.1 |
| 6,528,138 | B2 * | 3/2003 | Meinders et al. | 428/64.1 |
| 7,167,431 | B2 * | 1/2007 | Miura et al. | 369/59.11 |
| 2001/0012257 | A1 * | 8/2001 | Suzuki et al. | 369/94 |
| 2002/0024913 | A1 * | 2/2002 | Kojima et al. | 369/94 |
| 2002/0160306 | A1 * | 10/2002 | Hanaoka et al. | 430/270.13 |
| 2003/0081523 | A1 * | 5/2003 | Miyagawa et al. | 369/59.11 |
| 2003/0134229 | A1 * | 7/2003 | Yasuda et al. | 430/270.13 |
| 2004/0174796 | A1 * | 9/2004 | Mizushima et al. | 369/94 |
| 2004/0241581 | A1 | 12/2004 | Kakiuchi et al. | |

FOREIGN PATENT DOCUMENTS

| | | |
|---|---|---|
| JP | 3049054 | 3/1991 |
| JP | 2001-243655 | 9/2001 |

* cited by examiner

*Primary Examiner*—Ali Neyzari
(74) *Attorney, Agent, or Firm*—Seed IP Law Group PLLC

(57) ABSTRACT

An optical recording medium includes a support substrate and two information recording layers, an information recording layer close to a light incidence plane through which a laser beam is projected including a first dielectric film, a second dielectric film and a recording layer disposed between the first dielectric film and the second dielectric film and a thickness of each of the first dielectric film and the second dielectric film being determined so as to be equal to or larger than D21 and equal to or smaller than D22, where D21 is smaller than D2, D22 is larger than D2, and D21 and D22 are determined in such a manner that the dependency X of light transmittance of the information recording layer close to the light incidence plane on the wavelength of a laser beam is smaller than $1.2 \cdot X2$ when each of the first dielectric film and the second dielectric film has a thickness of D21 to D22, where X2 is the wavelength dependency corresponding to a second smallest thickness among a plurality of thicknesses at which the dependency X of light transmittance of the information recording layer close to the light incidence plane on the wavelength of a laser beam locally becomes minimal. According to thus constituted optical recording medium, it is possible to markedly reduce the dependency of light transmittance of the information recording layer close to the light incidence plane on the wavelength of the laser beam.

19 Claims, 12 Drawing Sheets

A

OPTICAL RECORDING MEDIUM

BACKGROUND OF THE INVENTION

The present invention relates to an optical recording medium, and particularly, to an optical recording medium which includes a plurality of information recording layers and in which the dependency of light transmittance of at least one information recording layer other than an information recording layer farthest from a light incidence plane through which a laser beam is projected on the wavelength of the laser beam can be markedly reduced.

DESCRIPTION OF THE PRIOR ART

Optical recording media such as the CD, DVD and the like have been widely used as recording media for recording digital data. Such optical recording media require improvement in ability to record large amounts of data and various proposals have been made in order to increase the data recording capacity thereof.

One of these is an optical recording medium having two information recording layers and such an optical recording medium has been already put to the practical use as an optical recording medium adapted to enable only data reading, such as the DVD-Video and the DVD-ROM.

An optical recording medium adapted only for reading data and provided with two information recording layers is formed by laminating two substrates each having prepits constituting an information recording layer on the surface thereof via an intermediate layer.

Further, an optical recording medium having two information recording layers has been recently proposed in connection with optical recording media in which data can be recorded by the user (See Japanese Patent Application Laid Open No. 2001-243655 etc.).

In the optical recording medium disclosed in Japanese Patent Application Laid Open No. 2001-243655, each recording layer includes a recording film formed of a phase change material and dielectric films (protective films) sandwiching the recording film therebetween and two information recording layers each having such a configuration are laminated via an intermediate layer.

In the case where data are to be recorded in an optical recording medium having a plurality of recording films in which data can be recorded by the user, a laser beam whose power is modulated so as to be equal to a recording power Pw higher than a reproducing power Pr is focused onto one or the other of the information recording layers and projected thereonto, thereby changing the state of a recording film included in the information recording layer irradiated with the laser beam and forming a record mark in the recording film. Since the reflection coefficients differ between the region of the recording film where a record mark is formed and blank regions of the recording film, data can be reproduced by projecting a laser beam whose power is set to a reproducing power Pr onto the recording film and detecting an amount of the laser beam reflected by the recording film.

In an optical recording medium including a plurality of information recording layers, namely, an L0 layer, an L1 layer, an L2 layer, an L3 layer, an L4 layer, . . . and an Lm layer, where the L0 layer is the farthest information recording layer from the light incident plane and the Lm layer is the closest information recording layer to the light incident plane, recording data of data in and reproduction of data from the L0 layer is accomplished by projecting a laser beam onto the L0 layer via the L1 layer, the L2 layer, the L3 layer, the L4 layer, . . . and the Lm layer. Therefore, in order to record data in or reproduce data from the information recording layer farther from the light incident plane in a desired manner, it is necessary for each of information recording layers located closer to the light incident plane than the information recording layer to have a sufficiently high light transmittance and it is accordingly usual for each of them to have no reflective film or to have only an extremely thin reflective film.

In the thus constituted optical recording medium including a plurality of information recording layers, namely, an L0 layer, an L1 layer, an L2 layer, an L3 layer, an L4 . . . layer, and an Lm layer, in the case of recording data in or reproducing data from an Ln layer where n is an integer equal to or larger than 2 and equal to or smaller than m, since a laser beam is projected onto the Ln layer via the L1 layer to an L(n−1) layer, the amount of the laser beam projected onto the Ln layer or the amount of the laser beam reflected from the Ln layer and detected is greatly influenced by light transmittances of the L1 layer to the L(n−1) layer.

However, since the light transmittance of an information recording layer varies with the wavelength of a laser beam, if the wavelength of the laser beam fluctuates due to change in temperature or the like during data recording or data reproducing, the amount of the laser beam projected onto the Ln layer or the amount of the laser beam reflected from the Ln layer and detected also fluctuates.

Further, in the case where the wavelength of a laser beam emitted from a laser beam source is different from the designed wavelength, the amount of the laser beam projected onto the Ln layer or the amount of the laser beam reflected from the Ln layer and detected becomes different from that expected.

SUMMARY OF THE INVENTION

It is therefore an object of the present invention to provide an optical recording medium which includes a plurality of information recording layers and in which the dependency of light transmittance of at least one information recording layer other than an information recording layer farthest from a light incidence plane through which a laser beam is projected on the wavelength of the laser beam can be markedly reduced.

The inventors of the present invention vigorously pursued a study for accomplishing the above object of the present invention and, as a result, made the discovery that the wavelength dependency of light transmittance(s) of an information recording layer(s) other than an information recording layer farthest from a light incidence plane on the wavelength of a laser beam periodically varies with the thickness of a dielectric film formed adjacent to a recording layer included in the information recording layer and a graph of the wavelength dependency of the light transmittance of the information recording layer on the wavelength of the laser beam with respect to the thickness of the dielectric film has a plurality of minimal values.

Each of FIGS. 1 and 2 is a graph showing how dependency X of light transmittance of an information recording layer other than an information recording layer farthest from a light incidence plane on the wavelength of a laser beam varies when the thickness of a first dielectric film or a second dielectric film is fixed while the thickness of the second dielectric film or the first dielectric film varies in the case where the information recording layer other than an information recording layer farthest from the light incidence plane includes the first dielectric film, the second dielectric film and a recording layer disposed between the first dielectric film and the second dielectric film. The graph of FIG. 1 represents the dependency in the case where the second dielectric film or the first dielectric film is formed of a mixture of ZnS and SiO$_2$ and the graph of FIG. 2 represents the dependency in the case where the second dielectric film or the first dielectric film is formed of TiO$_2$. In FIGS. 1 and 2, the dependency X of light transmittance of the information recording layer on the wavelength of a laser beam is defined as X=|T1−T2|/T0 where T0 is light transmittance of the information recording layer for a laser beam having a predetermined wavelength λ0, T1 is light transmittance of the information recording layer for a laser beam having a wavelength λ1 shorter than the predetermined wavelength λ0 by 5% and T2 is light transmittance of the information recording layer for a laser beam having a wavelength λ2 longer than the predetermined wavelength λ0 by 5%.

As shown in each of FIGS. 1 and 2, the dependency X of light transmittance of the information recording layer on the wavelength of a laser beam periodically varies with the thickness of the second dielectric film or the first dielectric film so that the wavelength dependency X assumes a first local minimal value X1 when the thickness of the second dielectric film or the first dielectric film is equal to D1, assumes a second local minimal value X2 when the thickness of the second dielectric film or the first dielectric film is equal to D2, assumes a third local minimal value X3 when the thickness of the second dielectric film or the first dielectric film is equal to D3 and assumes a local minimal value Xn each time the thickness of the second dielectric film or the first dielectric film increases by a value substantially equal to ΔD, where ΔD is a constant dependent upon the material of the second dielectric film or the first dielectric film.

As shown in each of FIGS. 1 and 2, in the case where the second dielectric film or the first dielectric film is formed of a mixture of ZnS and SiO$_2$, the dependency X of light transmittance of the information recording layer on the wavelength of a laser beam becomes minimum at the second local minimal value X2 and that in the case where the second dielectric film or the first dielectric film is formed of TiO$_2$, the dependency X of light transmittance of the information recording layer on the wavelength of a laser beam becomes minimum at the first local minimal value X1.

In a study done by the inventors of the present invention, it was confirmed that in the case where the thickness of the second dielectric film or the first dielectric film was fixed and the thickness of the first dielectric film or the second dielectric film varied, the dependency X of light transmittance of the information recording layer on the wavelength of a laser beam periodically varied with the thickness of the first dielectric film or the second dielectric film and that in the case where the first dielectric film and the second dielectric film were formed of a material other than a mixture of ZnS and SiO$_2$ or TiO$_2$, the dependency X of light transmittance of the information recording layer on the wavelength of a laser beam had a similar periodic tendency to that shown in one of FIGS. 1 and 2.

Therefore, it is possible to reduce the dependency X of light transmittance of the information recording layer on the wavelength of a laser beam by determining the thickness of the first dielectric film or the second dielectric film so that the dependency X of light transmittance of the information recording layer on the wavelength of a laser beam assumes any one of local minimal values.

However, in a further study done by the inventors of the present invention, it was found that when, owing to the need for an information recording layer other than the information recording layer farthest from the light incidence plane to have sufficiently high light transmittance, the information recording layer other than the information recording layer farthest from the light incidence plane was provided with no reflective film or an extremely thin reflective film having a low water proofing ability, the recording layer included in the information recording layer became easily corroded. They further discovered that for preventing the recording layer from being corroded it was effective to increase the thickness of dielectric layers disposed on opposite sides of the recording layer but that when the dielectric layers were formed too thick, cracks were liable to be generated therein owing to internal stress thereof.

Therefore, if the thickness of at least one of the first dielectric film and the second dielectric film is determined so that the dependency X of light transmittance of the information recording layer on the wavelength of a laser beam assumes the second local minimal value X2, in other words, if the thickness of at least one of the first dielectric film and the second dielectric film is determined so as to be equal to the thickness D2, since the at least one of the first dielectric film and the second dielectric film is neither too thin nor too thick, it is possible to reduce the dependency X of light transmittance of an information recording layer other than an information recording layer farthest from a light incidence plane on the wavelength of a laser beam and prevent the information recording layer from being corroded.

However, in a further study done by the inventors of the present invention, it was found that in order to reduce the dependency X of light transmittance of an information recording layer other than an information recording layer farthest from a light incidence plane on the wavelength of a laser beam and prevent the information recording layer from being corroded, it was not absolutely necessary to determine the thickness of at least one of the first dielectric film and the second dielectric film so as to be equal to the thickness D2 but it was sufficient to determine the thickness of at least one of the first dielectric film and the second dielectric film so as to be equal to or larger than D21 and equal to or smaller than D22, where D21 was smaller than D2, D22 was larger than D2, and D21 and D22 were determined in such a manner that the dependency X of light transmittance of an information recording layer other than an information recording layer farthest from a light incidence plane on the wavelength of a laser beam was smaller than 1.2·X2 when at least one of the first dielectric film and the second dielectric film had a thickness of D21 to D22.

The present invention is based on these discoveries and according to the present invention, the above and other objects can be accomplished by an optical recording medium comprising a support substrate and a plurality of information recording layers, at least one information recording layer other than an information recording layer farthest from a light incidence plane through which a laser beam is projected comprising a first dielectric film, a second dielectric film and a recording layer disposed between the first dielectric film and the second dielectric film and a thickness of at least one of the first dielectric film and the second dielectric film being determined so as to be equal to or larger than D21 and equal to or smaller than D22, where D21 is smaller than D2, D22 is larger than D2, and D21 and D22 are determined in such a manner that the dependency X of light transmittance of the information recording layer other than the information recording layer farthest from the light incidence plane on the wavelength of a laser beam is smaller than 1.2·X2 when at least one of the first dielectric film and the second dielectric film has a thickness of D21 to D22, where X2 is the wavelength dependency corresponding to a second smallest thickness among a plurality of thicknesses at which the dependency X of light transmittance of the at least one information recording layer other than the information recording layer farthest from the light incidence plane on the wavelength of a laser beam locally becomes minimal.

According to the present invention, it is possible to reduce the dependency X of light transmittance of an information recording layer other than an information recording layer farthest from a light incidence plane on the wavelength of a laser beam and prevent the information recording layer from being corroded.

In a preferred aspect of the present invention, the optical recording medium includes two information recording layers and an information recording layer close to the light incidence plane includes a first dielectric film, a second dielectric film and a recording layer disposed between the first dielectric film and the second dielectric film and a thickness of at least one of the first dielectric film and the second dielectric film being determined so as to be equal to or larger than D21 and equal to or smaller than D22, where D21 is smaller than D2, D22 is larger than D2, and D21 and D22 are determined in such a manner that the dependency X of light transmittance of the information recording layer close to the light incidence plane on the wavelength of a laser beam is smaller than 1.2·X2 when at least one of the first dielectric film and the second dielectric film has a thickness of D21 to D22, where X2 is the dependency corresponding to a second smallest thickness among a plurality of thicknesses at which the dependency of light transmittance of the information recording layer close to the light incidence plane on the wavelength of a laser beam locally becomes minimal.

In a preferred aspect of the present invention, the laser beam has a wavelength of 380 nm to 450 nm.

In a preferred aspect of the present invention, the at least one of the first dielectric film and the second dielectric film is formed of a mixture of ZnS and $SiO_2$.

In a study done by the inventors of the present invention, it was found that in the case where the at least one of the first dielectric film and the second dielectric film was formed of a mixture of ZnS and $SiO_2$, the dependency of the light transmittance of the information recording layer on the wavelength of a laser beam could be reduced more when the thickness of the at least one of the first dielectric film and the second dielectric film was determined so as to be equal to or larger than D21 and equal to or smaller than D22 than when the thickness of the at least one of the first dielectric film and the second dielectric film was determined so as to be substantially equal to the smallest thickness among a plurality of thicknesses at which wavelength dependency of light transmittance on a wavelength of the laser beam locally became minimal. Therefore, according to this preferred aspect of the present invention, it is possible to greatly reduce the dependency of the light transmittance of the information recording layer other than the information recording layer farthest from the light incidence plane on the wavelength of a laser beam.

In a further preferred aspect of the present invention, the light incidence plane is disposed on the side opposite to the support substrate with respect to the plurality of information recording layers, the first dielectric film is disposed on the side of the light incidence plane with respect to the recording layer and is formed of $TiO_2$, and the second dielectric film is disposed on the side of the support substrate and is formed of a mixture of ZnS and $SiO_2$.

Since polycarbonate resin has excellent workability and optical property, it is often used for the support substrate of an optical recording medium. However, polycarbonate resin has relatively high water permeability. Therefore, in the case where the support substrate is formed of polycarbonate resin, there is a risk of the recording layers included in the information recording layers being corroded. In particular, since it is necessary for an information recording layer other than the information recording layer farthest from the light incidence plane to have sufficiently high light transmittance, the information recording layer other than the information recording layer farthest from the light incidence plane is provided with no reflective film or an extremely thin reflective film having a low water proofing ability and, therefore, the recording layer included in the information recording layer becomes easily corroded. However, according to this preferred aspect of the present invention, since the second dielectric film disposed on the side of the support substrate is formed of a mixture of ZnS and $SiO_2$ having an excellent water-blocking property, it is possible to effectively prevent the recording layer included in the information recording layer other than the information recording layer farthest from the light incidence plane from being corroded by water passing through the support substrate.

Further, according to this preferred aspect of the present invention, since the dielectric layer formed of $TiO_2$ has a high refractive index with respect to a laser beam having a wavelength of 380 nm to 450 nm, in the case where the first dielectric layer is formed of $TiO_2$, it is possible to improve optical characteristics of an optical recording medium.

In a preferred aspect of the present invention, the recording layer is constituted by a first recording film containing one element selected from the group consisting of Si, Ge, Sn, Mg, In, Zn, Bi and Al as a primary component and a second recording film containing one element selected from the group consisting of Cu, Al, Zn, Ti and Ag and different from the element contained in the first recording film as a primary component.

In the case where the at least one information recording layer other than the farthest information recording layer from a light incidence plane among the plurality of information recording layers is formed so as to include a first recording film containing an element selected from the group consisting of Si, Ge, Sn, Mg, In, Zn, Bi and Al as a primary component and a second recording film containing an element selected from a group consisting of Cu, Al, Zn, Ti and Ag as a primary component, when data are recorded in the at least one information recording layer, the element contained in the first recording film as a primary component and the element contained in the second recording film as a primary component are mixed with each other by a laser beam, thereby forming a record mark whose reflection coefficient is different from those of other regions of the first recording film and the second recording film and data can be recorded in the at least one information recording layer with high sensitivity.

Furthermore, the inventors of the present invention made the discovery that in the case where the at least one information recording layer other than the farthest information recording layer from a light incidence plane among the plurality of information recording layers was formed so as to include a first recording film containing an element selected from the group consisting of Si, Ge, Sn, Mg, In, Zn, Bi and Al as a primary component and a second recording film containing an element selected from a group consisting of Cu, Al, Zn, Ti and Ag as a primary component, light transmittance of the information recording layer with respect to a laser beam having a wavelength of 380 nm to 450 nm is sufficiently high and it is therefore possible to record data in and reproduce data from the information recording layer farthest from the light incidence plane in a desired manner. The inventors of the present invention made the further discovery that in the thus constituted information recording layer, the difference in light transmittances for a laser beam having a wavelength of 380 nm to 450 nm between a region where a record mark was formed and a blank region was equal to or lower than 4% and in the case of recording data in the farthest information recording layer from a light incidence plane or reproducing data from the farthest information recording layer from a light incidence plane by irradiating it with a laser beam having a wavelength of 380 nm to 450 nm via the at least one information recording layer, even if a region of the information recording layer through which the laser beam is transmitted contained a boundary between a region where a record mark is formed and a blank region, it was possible to record data in the farthest information recording layer from a light incidence plane and reproduce data from the farthest information recording layer from the light incidence plane in a desired manner.

In a further preferred aspect of the present invention, the first recording film contains Si as a primary component and the second recording film contains Cu as a primary component.

In a study done by the inventors of the present invention, it was found that in an information recording layer constituted by a first recording film containing Si as a primary component and a second recording film containing Cu as a primary component, the difference in light transmittances for a laser beam having a wavelength of 380 nm to 450 nm between a region where a record mark was formed and a blank region was much smaller and it was therefore possible to record data in the farthest information recording layer from a light incidence plane and reproduce data from the farthest information recording layer from the light incidence plane in a desired manner.

The above and other objects of the present invention can be also accomplished by an optical recording medium comprising a support substrate and a plurality of information recording layers, at least one information recording layer other than an information recording layer farthest from a light incidence plane through which a laser beam is projected comprising a first dielectric film, a second dielectric film and a recording layer disposed between the first dielectric film and the second dielectric film, and at least one of the first dielectric film and the second dielectric film being formed of a mixture of ZnS and $SiO_2$ so as to have a thickness of 100 nm to 130 nm.

In a study done by the inventors of the present invention, it was found that in the case where the at least one of the first dielectric film and the second dielectric film was formed of a mixture of ZnS and $SiO_2$, when the at least one of the first dielectric film and the second dielectric film had a thickness of 100 nm to 130 nm, the dependency X of light transmittance of the information recording layer on the wavelength of a laser beam assumed the second local minimal value X2. Therefore, according to the present invention, it is possible to reduce the dependency X of light transmittance of an information recording layer other than an information recording layer farthest from a light incidence plane on the wavelength of a laser beam and prevent the information recording layer from being corroded.

The above and other objects and features of the present invention will become apparent from the following description made with reference to the accompanying drawings.

DESCRIPTION OF THE PREFERRED EMBODIMENTS

Figure 3:
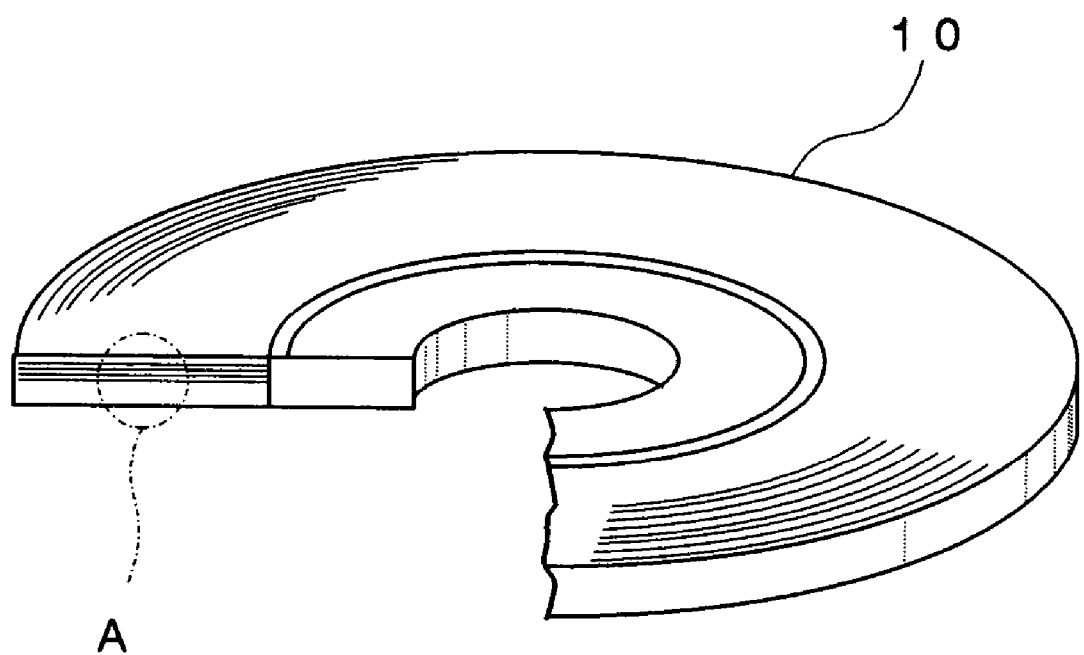
FIG. 3 is a schematic perspective view showing an optical recording medium that is a preferred embodiment of the present invention.
Figure 4:
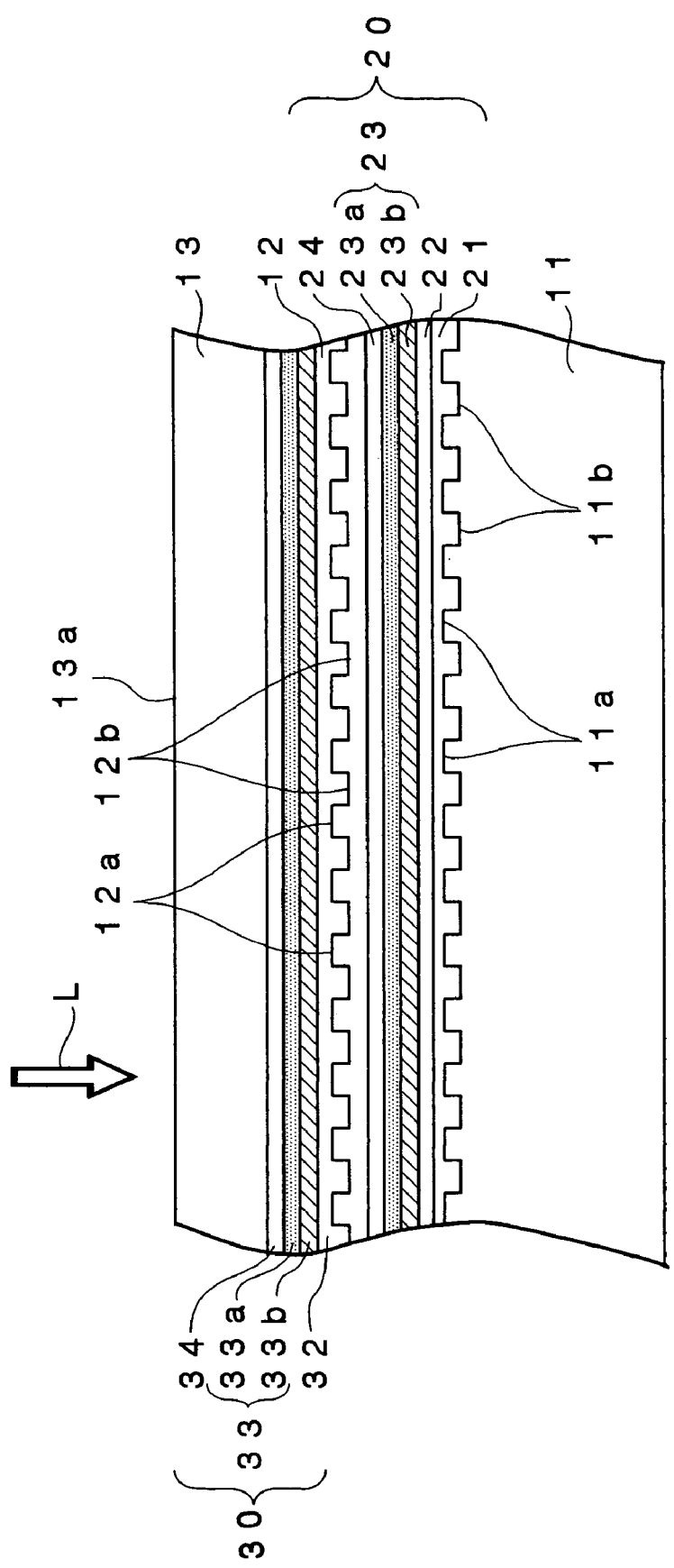
FIG. 4 is an enlarged schematic cross-sectional view of the part of the optical recording medium indicated by A in FIG. 3.

FIG. 3 is a schematic perspective view showing an optical recording medium that is a preferred embodiment of the present invention and FIG. 4 is a schematic enlarged cross-sectional view indicated by A in FIG. 3.

As shown in FIG. 3, an optical recording medium 10 according to this embodiment is formed disk-like and has an outer diameter of about 120 mm and a thickness of about 1.2 mm.

As shown in FIG. 4, the optical recording medium 10 according to this embodiment includes a disk-like support substrate 11, a transparent intermediate layer 12, a light transmission layer (protective layer) 13, an L0 information recording layer 20 formed between the support substrate 11 and the transparent intermediate layer 12, and an L1 information recording layer 30 formed between the transparent layer 12 and the light transmission layer 13.

The L0 information recording layer 20 and the L1 information recording layer 30 are information recording layers in which data are recorded, i.e., the optical recording medium 10 according to this embodiment includes two information recording layers.

The L0 information recording layer 20 constitutes an information recording layer far from a light incident plane 13a and is constituted by laminating a reflective film 21, a fourth dielectric film 22, a recording layer 23 and a third dielectric film 24 from the side of the support substrate 11.

As shown in FIG. 4, the recording layer 23 of the L0 information recording layer 20 includes a first L0 recording film 23a disposed on the side of the support substrate 11 and a second L0 recording film 23b disposed on the side of the light transmission layer 13.

On the other hand, the L1 information recording layer 30 constitutes an information recording layer close to the light incident plane 13a and is constituted by laminating a second dielectric film 32, a recording layer 33 and a first dielectric film 34 from the side of the support substrate 11.

As shown in FIG. 4, the recording layer 33 of the L1 information recording layer 30 includes a first L1 recording film 33a disposed on the side of the support substrate 11 and a second L1 recording film 33b disposed on the side of the light transmission layer 13.

The support substrate 11 serves as a support for ensuring mechanical strength and a thickness of about 1.2 mm required for the optical recording medium 10.

The material used to form the support substrate 11 is not particularly limited insofar as the support substrate 11 can serve as the support of the optical recording medium 10. The support substrate 11 can be formed of glass, ceramic, resin or the like. Among these, resin is preferably used for forming the support substrate 11 since resin can be easily shaped. Illustrative examples of resins suitable for forming the support substrate 11 include polycarbonate resin, polyolefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and polyolefin resin are most preferably used for forming the support substrate 11 from the viewpoint of easy processing, optical characteristics and the like and in this embodiment, the support substrate 11 is formed of polycarbonate resin. In this embodiment, since the laser beam L is projected via the light incident plane 13a located opposite to the support substrate 11, it is unnecessary for the support substrate 11 to have a light transmittance property.

As shown in FIG. 4, grooves 11a and lands 11b are alternately and spirally formed on the surface of the support substrate 11 so as to extend from a portion in the vicinity of the center of the support substrate 11 toward the outer circumference. The grooves 11a and/or lands 11b serve as a guide track for the laser beam L when data are to be recorded in the L0 information recording layer 20 or when data are to be reproduced from the L0 information recording layer 20.

The depth of the groove 11a is not particularly limited and is preferably set to 10 nm to 40 nm. The pitch of the grooves 11a is not particularly limited and is preferably set to 0.2 μm to 0.4 μm.

The support substrate 11 is preferably fabricated by an injection molding process using a stamper but the support substrate 11 may be fabricated by other processes such as a 2P process.

The transparent intermediate layer 12 serves to space the L0 information recording layer 20 and the L1 information recording layer 30 apart by a physically and optically sufficient distance.

As shown in FIG. 4, grooves 12a and lands 12b are alternately formed on the surface of the transparent intermediate layer 12. The grooves 12a and/or lands 12b formed on the surface of the transparent intermediate layer 12 serve as a guide track for the laser beam L when data are to be recorded in the L1 layer 30 or when data are to be reproduced from the L1 layer 30.

The depth of the groove 12a and the pitch of the grooves 12a can be set to be substantially the same as those of the grooves 11a formed on the surface of the support substrate 11.

It is preferable to form the transparent intermediate layer 12 so as to have a thickness of 5 μm to 50 μm and it is more preferable to form it so as to have a thickness of 10 μm to 40 μm.

The material for forming the transparent intermediate layer 12 is not particularly limited and an ultraviolet ray curable acrylic resin is preferably used for forming the transparent intermediate layer 12.

It is necessary for the transparent intermediate layer 12 to have sufficiently high light transmittance since the laser beam L passes through the transparent intermediate layer 12 when data are to be recorded in the L1 information recording layer 30 and data recorded in the L1 information recording layer 30 are to be reproduced.

The transparent intermediate layer 12 is preferably formed by a 2P process using a stamper but the transparent intermediate layer 12 may be formed by other processes.

The light transmission layer 13 serves to transmit the laser beam L and the light incident plane 13a is constituted by one of the surfaces thereof.

It is preferable to form the light transmission layer 13 so as to have a thickness of 30 μm to 200 μm.

The material for forming the light transmission layer 13 is not particularly limited and, similarly to the transparent intermediate layer 12, an ultraviolet ray curable acrylic resin is preferably used for forming the light transmission layer 13.

The light transmission layer 13 may be formed by adhering a sheet made of light transmittable resin to the surface of the L1 layer 30 using an adhesive agent.

It is necessary for the light transmission layer 13 to have sufficiently high light transmittance since the laser beam L passes through the transparent intermediate layer 13 when data are to be recorded and data are to be reproduced.

As shown in FIG. 4, the L1 information recording layer 30 includes the second L1 recording film 33b and the first L1 recording film 33a and the first L1 recording film 33a contains Si as a primary component and the second L1 recording film 33b containing Cu as a primary component.

In order to lower the noise level of a reproduced signal and improve the storage reliability of the optical recording medium 10, it is preferable to add one or more elements selected from the group consisting of Al, Zn, Sn, Mg and Au to the second L1 recording film 33b.

Similarly, as shown in FIG. 4, the L0 information recording layer 20 includes the second L0 recording film 23b and the first L0 recording film 23a and the first L0 recording film 23a contains Si as a primary component and the second L0 recording film 23b containing Cu as a primary component.

In order to lower the noise level of a reproduced signal and improve the storage reliability of the optical recording medium 10, it is preferable to add one or more elements selected from the group consisting of Al, Zn, Sn, Mg and Au to the second L0 recording film 23b.

Figure 5:
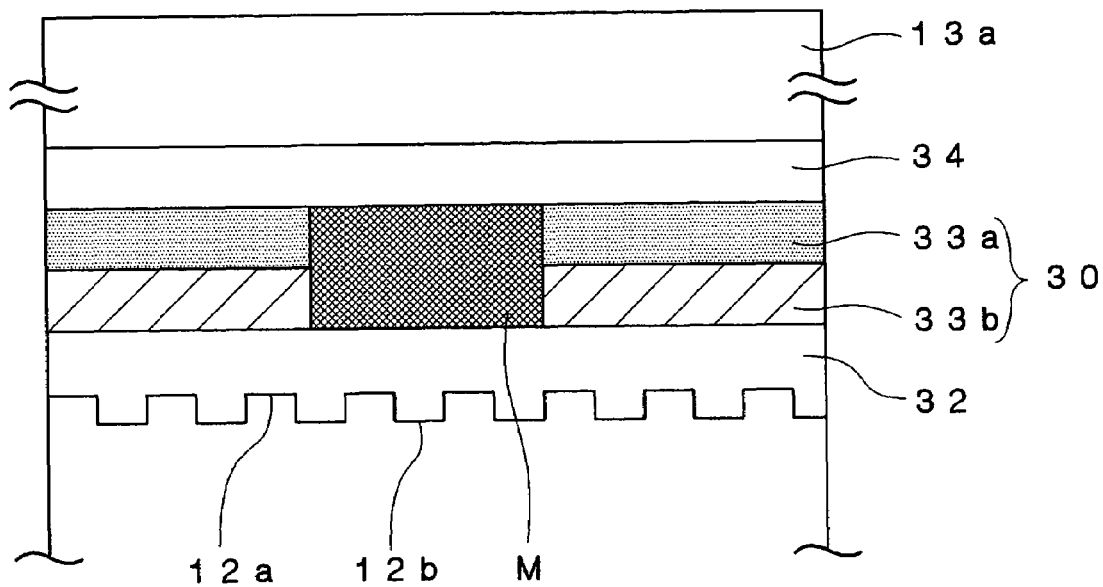
FIG. 5 is a schematic enlarged cross-sectional view showing the optical recording medium shown in FIG. 3 after an L1 information recording layer was irradiated with a laser beam.

FIG. 5 is a schematic enlarged cross-sectional view showing the optical recording medium 10 shown in FIG. 3 after the L1 information recording layer 30 was irradiated with a laser beam L.

As shown in FIG. 5, when the L1 information recording layer 30 of the optical recording medium 10 is irradiated with a laser beam L via a light incident plane 13a, Si contained in the first recording film 33a as a primary component and Cu contained in the second recording film 33b as a primary component are quickly fused or diffused and a region M where Si and Cu are mixed is formed, thereby forming a record mark M.

When data are to be recorded in the optical recording medium 10, it is preferable to focus a laser beam L having a wavelength of 380 nm to 450 nm, preferably 405 nm onto the L1 information recording layer 30 using an objective lens having a numerical aperture NA of about 0.85.

As shown in FIG. 5, when Si contained in the first L1 recording film 33a as a primary component and Cu contained in the second L1 recording film 33b as a primary component are mixed to form a record mark M, the reflection coefficient of a region where the record mark has been formed greatly changes. Therefore, since the reflection coefficient of the region where the record mark is formed is greatly different from that of the region of the L1 information recording layer 30 surrounding the region where the record mark M is formed, it is possible to obtain a high reproduced signal (C/N ratio) by reproducing data recorded in the L1 information recording layer 30.

Figure 6:
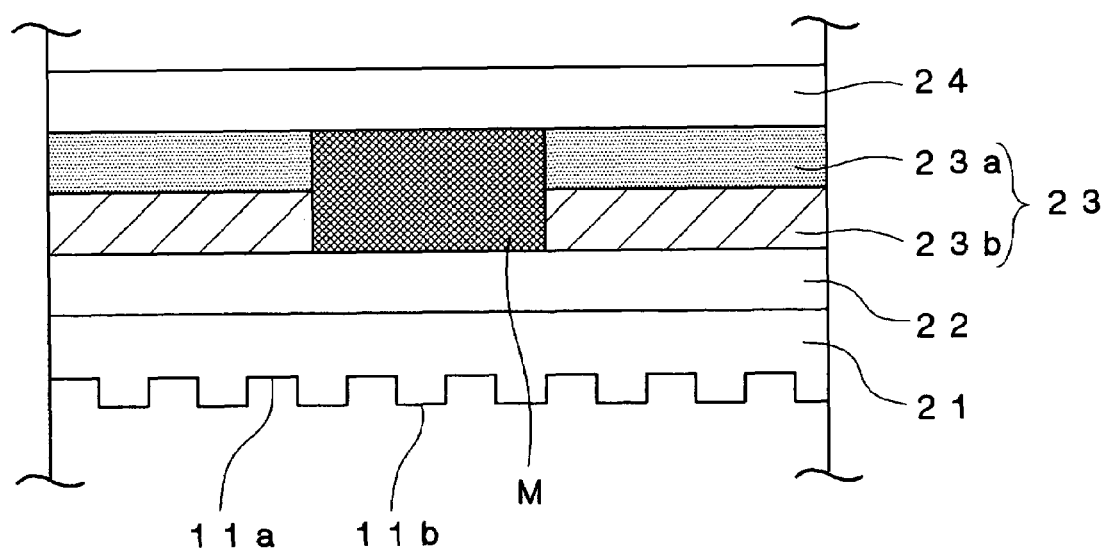
FIG. 6 is a schematic enlarged cross-sectional view showing the optical recording medium shown in FIG. 3 after an L0 information recording layer was irradiated with a laser beam.

FIG. 6 is a schematic enlarged cross-sectional view showing the optical recording medium shown in FIG. 3 after an L0 layer was irradiated with a laser beam.

When the L0 information recording layer 20 of the optical recording medium 10 is irradiated with a laser beam L via a light incident plane 13a, as shown in FIG. 6, Si contained in the first L0 recording film 23a as a primary component and Cu contained in the second L0 recording film 23b as a primary component are quickly fused or diffused and a region M where Si and Cu are mixed is formed, thereby forming a record mark M.

When data are to be recorded in the optical recording medium 10, it is preferable to focus a laser beam L having a wavelength of 380 nm to 450 nm, preferably 405 nm onto the L0 information recording layer 20 using an objective lens having a numerical aperture NA of about 0.85.

As shown in FIG. 6, when Si contained in the first L0 recording film 23a as a primary component and Cu contained in the second L0 recording film 23b as a primary component are mixed to form a record mark M, the reflection coefficient of a region where the record mark has been formed greatly changes. Therefore, since the reflection coefficient of the region where the record mark is formed is greatly different from that of the region of the L0 information recording layer 20 surrounding the region where the record mark M is formed, it is possible to obtain a high reproduced signal (C/N ratio) by reproducing data recorded in the L0 information recording layer 20.

Since the laser beam L passes through the L1 information recording layer 30 when data are recorded in the L0 information recording layer 20 and when data are reproduced from the L0 information recording layer 20, if the difference in light transmittances between a region of the L1 information recording layer 30 where a record mark M is formed and a blank region of the L1 information recording layer 30 where no record mark M is formed is great, when data are recorded in the L0 information recording layer 20, the amount of the laser beam L projected onto the L0 information recording layer 20 greatly changes depending upon whether the region of the L1 information recording layer 30 through which the laser beam L passes is a region where a record mark is formed or a blank region and when data are reproduced from the L0 information recording layer 20, the amount of the laser beam L reflected from the L0 information recording layer 20, transmitting through the L1 information recording layer 30 and detected greatly change depending upon whether the region of the L1 information recording layer 30 through which the laser beam L passes is a region where a record mark is formed or a blank region. As a result, the recording characteristics of the L0 information recording layer 20 and the amplitude of a signal reproduced from the L0 information recording layer 20 change greatly depending upon whether the region of the L1 information recording layer 30 through which the laser beam L passes is a region where a record mark M is formed or a blank region.

In particular, when data recorded in the L0 information recording layer 20 are reproduced, if the region of the L1 information recording layer 30 through which the laser beam L passes contains a boundary between a region where a record mark M is formed and a blank region, since the distribution of the reflection coefficient is not uniform at the spot of the laser beam L, data recorded in the L0 information recording layer 20 cannot be reproduced in a desired manner.

In a study done by the inventors of the present invention, it was found that the difference in light transmittances for a laser beam having a wavelength of 380 nm to 450 nm between the region of a record mark M formed by mixing Si and Cu and a blank region of the L1 information recording layer 30 formed by laminating the first L1 recording film 33a containing Si as a primary component and the second L1 recording film 33b containing Cu as primary component is equal to or lower than 3% and the difference in light transmittances for a laser beam having a wavelength of about 405 nm between a region of the L1 information recording layer 30 where a record mark M is formed and a blank region of the L1 information recording layer 30 is equal to or lower than 1%. Therefore, in this embodiment, since the first L1 recording film 33a of the L1 information recording layer 30 contains Si as primary component and the second L1 recording film 33b of the L1 information recording layer 30 contains Cu as primary component so that when laser beam L is projected thereonto via the light incident plane 13a, Si contained in the first L1 recording film 33a as a primary component and Cu contained in the second L1 recording film 33b as a primary component are mixed with each other, thereby forming a record mark M, it is possible to record data in the L0 information recording layer 20 and reproduce data from the L0 information recording layer 20 in a desired manner by projecting a laser beam L onto the L0 layer 20 via the L1 information recording layer 30.

Since the laser beam L passes through the L1 information recording layer 30 when data are to be recorded in the L0 information recording layer 20 and data recorded in the L0 information recording layer 20 are to be reproduced, it is necessary for the L1 information recording layer 30 to have a high light transmittance and it is therefore preferable to form the L1 information recording layer 30 to be thin insofar as difference in optical properties between before and after data recording can be sufficiently high.

Concretely, it is preferable to form the first L1 recording film 33a and the second L1 recording film 33b so that the total thickness thereof is 2 nm to 15 nm.

In the case where the total thickness of the first L1 recording film 33a and second L1 recording film 33b is thinner than 2 nm, the change in reflection coefficient between before and after irradiation with the laser beam L is small so that a reproduced signal having high strength (C/N ratio) cannot be obtained.

On the other hand, when the total thickness of the first L1 recording film 33a and the second L1 recording film 33b exceeds 15 nm, the light transmittance of the L1 information recording layer 30 is lowered and the recording characteristic and the reproducing characteristic of the L0 information recording layer 20 are degraded. Further, when the total thickness of the first L1 recording film 33a and the second L1 recording film 33b exceeds 15 nm, the recording sensitivity of the L1 information recording layer 30 becomes lower and the surface smoothness of the second L1 recording film 33b becomes worse, whereby the noise level of a reproduced signal from the L1 information recording layer 30 increases.

The third dielectric film 24 and the fourth dielectric film 22 serve as protective layers for protecting the first L0 recording film 23a and the second L0 recording film 23b, and the first dielectric film 34 and the second dielectric film 32 serve as protective layers for protecting the first L1 recording film 33a and the second L1 recording film 33b. As a result, degradation of data recorded in the L0 information recording layer 20 can be prevented over a long period by the third dielectric film 24 and the fourth dielectric film 22 and degradation of data recorded in the L1 information recording layer 30 can be prevented over a long period by the first dielectric film 34 and the second dielectric film 32.

The material for forming the fourth dielectric film 22, the third dielectric film 24, the second dielectric film 32 and the first dielectric film 34 is not particularly limited insofar as it is transparent in the wavelength range of the laser beam L and the fourth dielectric film 22, the third dielectric film 24, the second dielectric film 32 and the first dielectric film 34 can be formed of a dielectric material containing an oxide, sulfide, nitride or carbide, or a combination thereof, for example, as a primary component. In order to prevent the transparent intermediate layer 12 from being deformed by heat and improve the characteristics of the fourth dielectric film 22, the third dielectric film 24, the second dielectric film 32 and the first dielectric film 34 for protecting the L0 information recording layer 20 and the L1 information recording layer 30, it is preferable to form the fourth dielectric film 22, the third dielectric film 24, the second dielectric film 32 and the first dielectric film 34 of oxide, sulfide, nitride or carbide of Al, Si, Ce, Ti, Zn, Ta or the like, such as $Al_2O_3$, AlN, ZnO, ZnS, GeN, GeCrN, $CeO_2$, SiO, $SiO_2$, $Si_3N_4$, SiC, $La_2O_3$, TaO, $TiO_2$, SiAlON (mixture of $SiO_2$, $Al_2O_3$, $Si_3N_4$ and AlN), LaSiON (mixture of $La_2O_3$, $SiO_x$ and $Si_3N$) or the like, or a mixture thereof, and it is particularly preferable to form the fourth dielectric film 22, the third dielectric film 24 and the second dielectric film 32 of a mixture of ZnS and $SiO_2$ and form the first dielectric film 34 of $TiO_2$. In the case where the second dielectric film 32 is formed of a mixture of ZnS and $SiO_2$, the mole ratio of ZnS to $SiO_2$ is preferably 80:20.

The fourth dielectric film 22, the third dielectric film 24, the second dielectric film 32 and the first dielectric film 34 also serve to increase the difference in optical properties between before and after irradiation with the laser beam L and it is therefore preferable to form the fourth dielectric film 22, the third dielectric film 24, the second dielectric film 32 and the first dielectric film 34 of a material having a high refractive index n. In particular, it is preferable for the first dielectric film 34 on the side of the light incidence plane 13a to serves to greatly increase the difference in optical properties between before and after irradiation with the laser beam L and, therefore, in this embodiment, the first dielectric film 34 is formed of $TiO_2$ having a high refractive index n with respect to a laser beam L having a wavelength of 380 nm to 450 nm.

On the other hand, when a laser beam L is projected, the recording sensitivity of the optical recording medium 10 is lowered if a large amount of the laser beam L is absorbed in the fourth dielectric film 22, the third dielectric film 24, the second dielectric film 32 and the first dielectric film 34. It is therefore preferable to form the fourth dielectric film 22, the third dielectric film 24, the second dielectric film 32 and the first dielectric film 34 of a material having a low extinction coefficient k. Therefore, in this embodiment, the fourth dielectric film 22, the third dielectric film 24 and the second dielectric film 32 are formed of a mixture of ZnS and $SiO_2$ having a low extinction coefficient k with respect to a laser beam L having a wavelength of 380 nm 5 to 450 nm and the first dielectric film 34 is formed of $TiO_2$ having a low extinction coefficient k with respect to a laser beam L having a wavelength of 380 nm to 450 nm.

In the case of recording data in or reproducing data from the L0 information recording layer 20, since the laser beam L is projected onto the L0 information recording layer 20 via the L1 information recording layer 30, it is necessary for the L1 information recording layer 30 to have a sufficiently high light transmittance and a sufficiently low dependency X of light transmittance on the wavelength of the laser beam L. As mentioned above and shown in FIG. 2, in a study done by the inventors of the present invention, it was found that in the case where an information recording layer included a first dielectric film, a second dielectric film formed of a mixture of mixture of ZnS and $SiO_2$ and a recording layer formed between the first dielectric film and the second dielectric film and the thickness of the first dielectric film was fixed, the dependency X of light transmittance of the information recording layer on the wavelength of a laser beam periodically varied with the thickness of the second dielectric film and assumed a first local minimal value X1 at the thickness D1 of the second dielectric film, assumed a second local minimal value X2 at the thickness D2 of the second dielectric film and assumed a third local minimal value X3 at the thickness D3 of the second dielectric film. Therefore, in order to minimize the dependency X of light transmittance of the L1 information recording layer 30 on the wavelength of a laser beam L, it is preferable to set the thickness of the second dielectric film 32 so that the dependency X of light transmittance of the L1 information recording layer 30 on the wavelength of the laser beam L assumes any one of the local minimal values.

Figure 1:
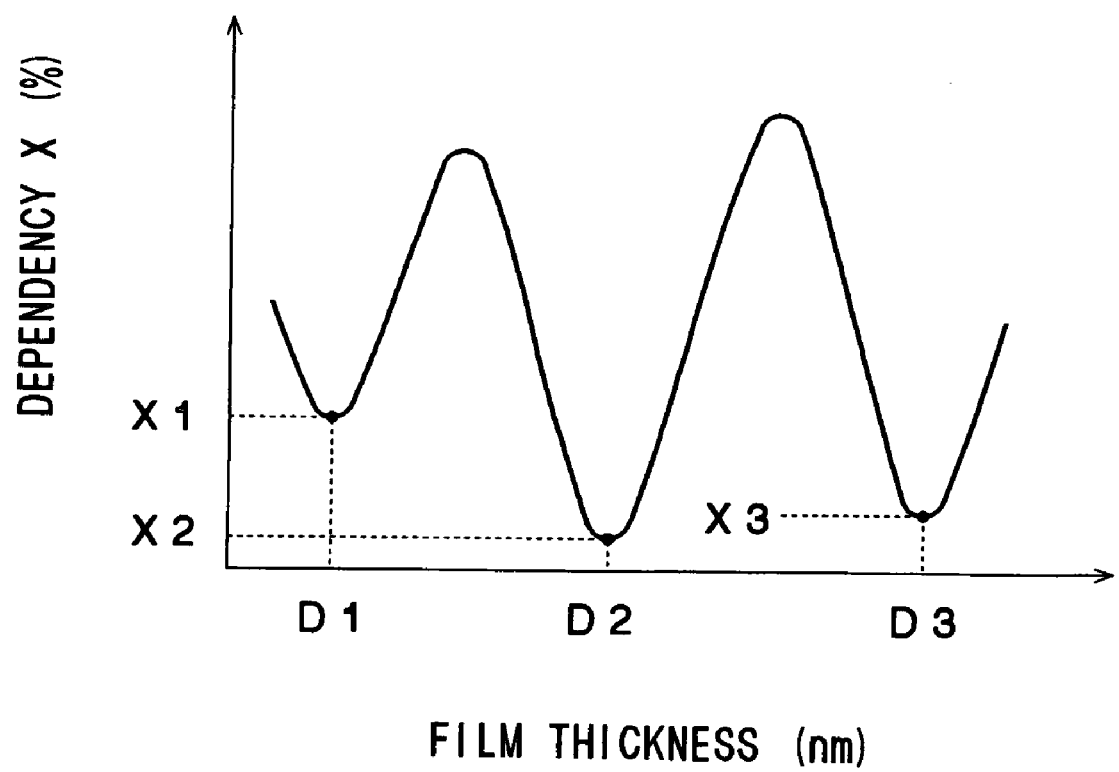
FIG. 1 is a graph showing how the dependency X of light transmittance of an information recording layer other than an information recording layer farthest from a light incidence plane on the wavelength of a laser beam varies when the thickness of a first dielectric film or a second dielectric film is fixed while the thickness of the second dielectric film or the first dielectric film varies, in the case where the second dielectric film or the first dielectric film is formed of a mixture of ZnS and $SiO_2$.
Figure 2:
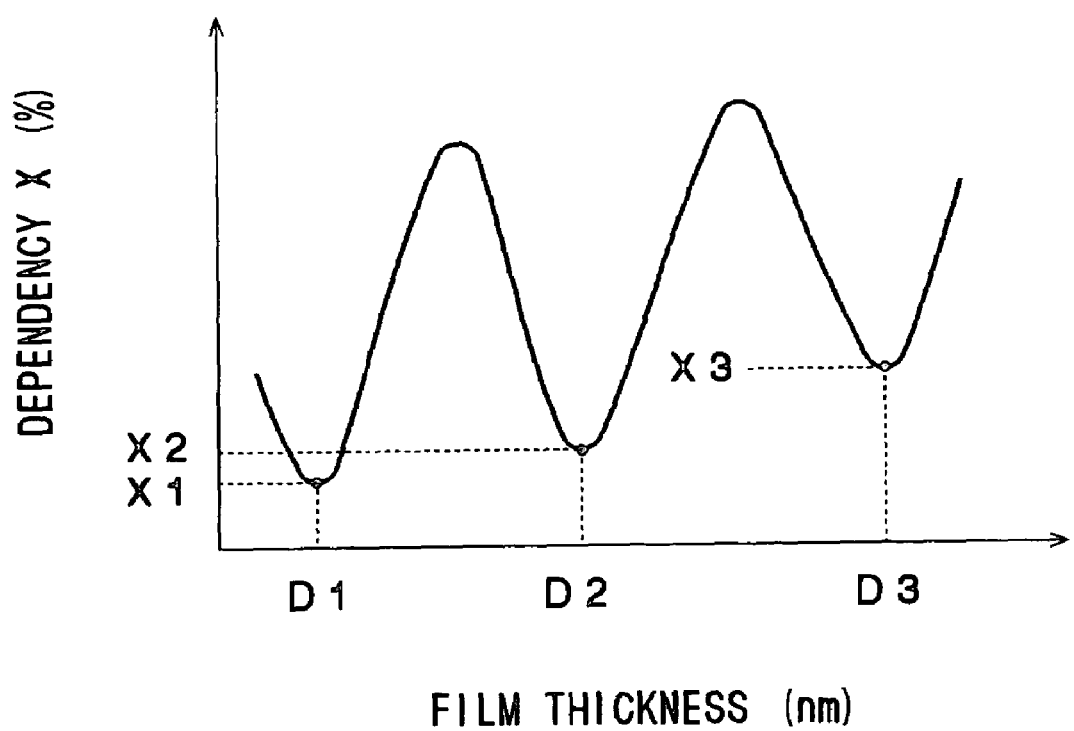
FIG. 2 is a graph showing how the dependency X of light transmittance of an information recording layer other than an information recording layer farthest from a light incidence plane on the wavelength of a laser beam varies when the thickness of a first dielectric film or a second dielectric film is fixed while the thickness of the second dielectric film or the first dielectric film varies, in the case where the second dielectric film or the first dielectric film is formed of $TiO_2$.

To the contrary, the inventors of the present invention found that, as shown in FIG. 2, in the case where an information recording layer included a first dielectric film formed of $TiO_2$, a second dielectric film and a recording layer formed between the first dielectric film and the second dielectric film and the thickness of the second dielectric film was fixed, the dependency X of light transmittance of the information recording layer on the wavelength of a laser beam L periodically varied with the thickness of the first dielectric film and assumed a first local minimal value X1 at the thickness D1 of the first dielectric film, assumed a second local minimal value X2 at the thickness D2 of the first dielectric film and assumed a third local minimal value X3 at the thickness D3 of the first dielectric film. Therefore, in order to minimize the dependency X of light transmittance of the L1 information recording layer 30 on the wavelength of the laser beam L, it is preferable to set the thickness of the second dielectric film 32 so that the dependency X of light transmittance of the L1 information recording layer 30 on the wavelength of a laser beam L1 assumes any one of the local minimal values.

Further, in this embodiment, since the support substrate 11 is formed of polycarbonate resin and polycarbonate resin has relatively high water permeability, there is a risk of water passing through the support substrate 11 and reaching the L0 information recording layer 20 and the L1 information recording layer 30. Although the L0 information recording layer 20 is provided with the reflective film 21 and is therefore not readily susceptible to corrosion, the L1 information recording layer 30 is at high risk of being corroded by water passing through the support substrate 11 since the L1 information recording layer 30 is not provided with a reflective film.

In order to solve this problem, it is effective to increase the thickness of the second dielectric film 32 of the L1 information recording layer 30 formed on the side of the support substrate 11. However, if the second dielectric film 32 is formed too thick, there is a risk of cracks being generated in the second dielectric film 32.

Therefore, in this embodiment, the second dielectric layer 32 disposed on the side of the support substrate 11 is formed of a mixture of ZnS and $SiO_2$ having an excellent water-blocking property so as to have a thickness substantially equal to a second smallest thickness D2 thicker than the thickness D1 among thicknesses at which wavelength dependency of light transmittance of the L1 information recording layer 30 on a wavelength of the laser beam locally becomes minimal.

As a consequence, according to this embodiment, the dependency X of light transmittance of the L1 information recording layer 30 on the wavelength of the laser beam L can be markedly reduced and it is further possible to effectively prevent the recording layer 33 of the L1 information recording layer 30 from being corroded by water passing through the support substrate 11 and effectively prevent cracks from being generated in the second dielectric film 32.

On the other hand, in this embodiment, the first dielectric layer 34 of the L1 information recording layer 30 disposed on the side of the light incidence plane 13a is formed of $TiO_2$ having an excellent optical property so as to have a thickness substantially equal to the smallest thickness among thicknesses at which wavelength dependency of light transmittance of the L1 information recording layer 30 on a wavelength of the laser beam locally becomes minimal.

Therefore, according to this embodiment, since the first dielectric film 34 disposed on the side of the light incidence plane 13a has sufficiently high light transmittance, the light transmittance of the L1 information recording layer 30 can be sufficiently increased and it is further possible to minimize the dependency X of light transmittance of the L1 information recording layer 30 on the wavelength of the laser beam L.

Concretely, in this embodiment, the second dielectric layer 32 is formed so as to have a thickness of 100 nm to 130 nm and the first dielectric layer 34 is formed so as to have a thickness of 20 nm to 30 nm.

To the contrary, in this embodiment, the L0 information recording layer 20 constitutes an information recording layer far from the light incidence plane 13a and a laser beam L is not projected through the L0 information recording layer 20 onto another information recording layer. Further, the L0 information recording layer 20 is provided with the reflective layer 21. Therefore, the thickness of each of the fourth dielectric film 22 and the third dielectric film 24 included in the L0 information recording layer 20 is not particularly limited.

Each of the reflective film 21, the fourth dielectric film 22, the second L0 recording film 23b, the first L0 recording film 23a and the third dielectric film 24 included in the L0 information recording layer 20, and the second dielectric film 33, the second L1 recording film 33b, the first L1 recording film 33a and the first dielectric film 34 included in the L1 information recording layer 30 can be formed by a vapor growth process using chemical species containing elements for forming it. Illustrative examples of the vapor growth processes include a sputtering process, vacuum deposition process and the like and the sputtering process is preferably used for forming them.

Figure 7:
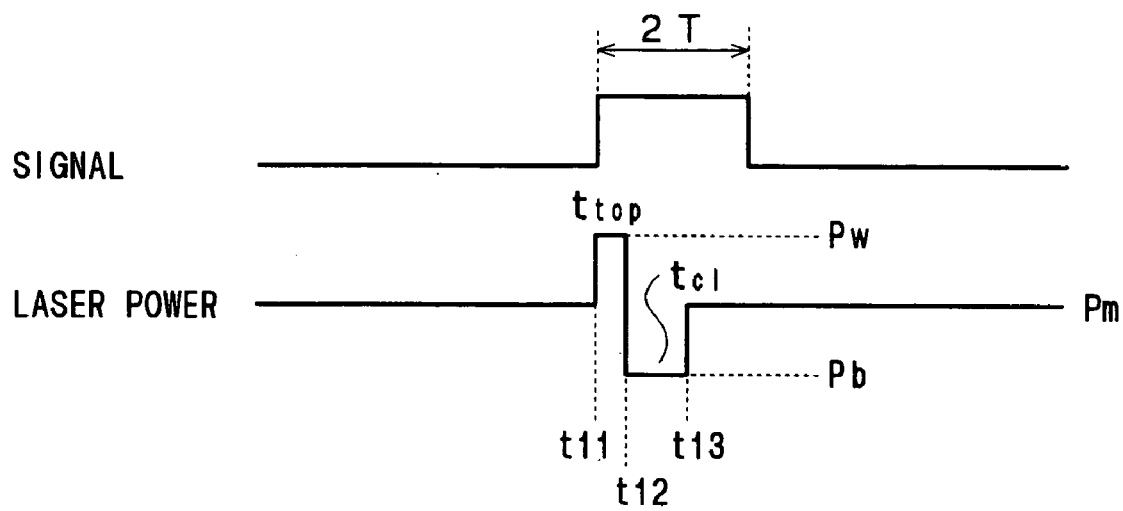
FIG. 7 is a diagram showing the waveform of a pulse pattern for modulating the power of a laser beam in the case of recording 2T signals in an L0 information recording layer or an L1 information recording layer of an optical recording medium.
Figure 8:
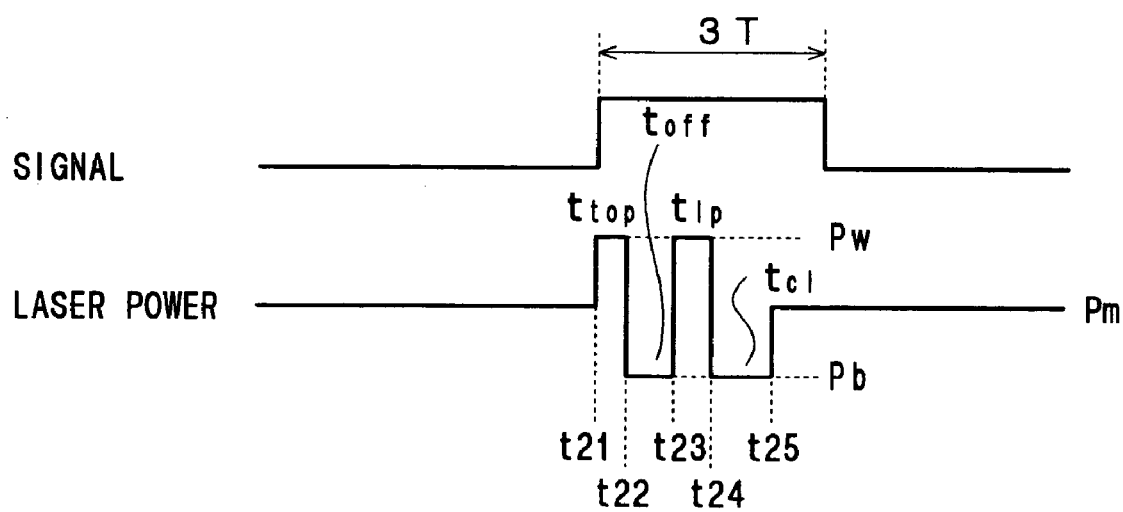
FIG. 8 is a diagram showing the waveform of a pulse pattern for modulating the power of a laser beam in the case of recording 3T signals in an L0 information recording layer or an L1 information recording layer of an optical recording medium.
Figure 9:
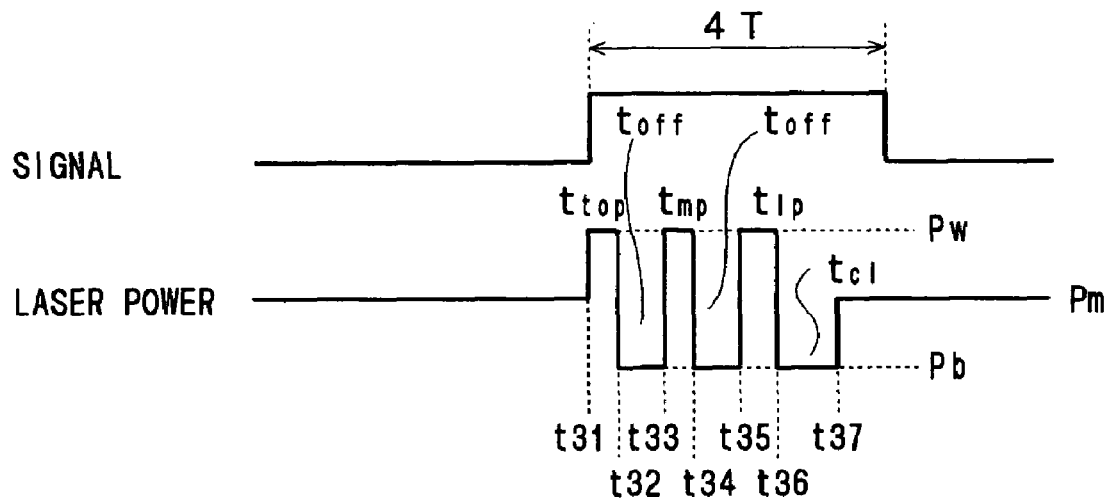
FIG. 9 is a diagram showing the waveform of a pulse pattern for modulating the power of a laser beam in the case of recording 4T signals in an L0 information recording layer or an L1 information recording layer of an optical recording medium.
Figure 10:
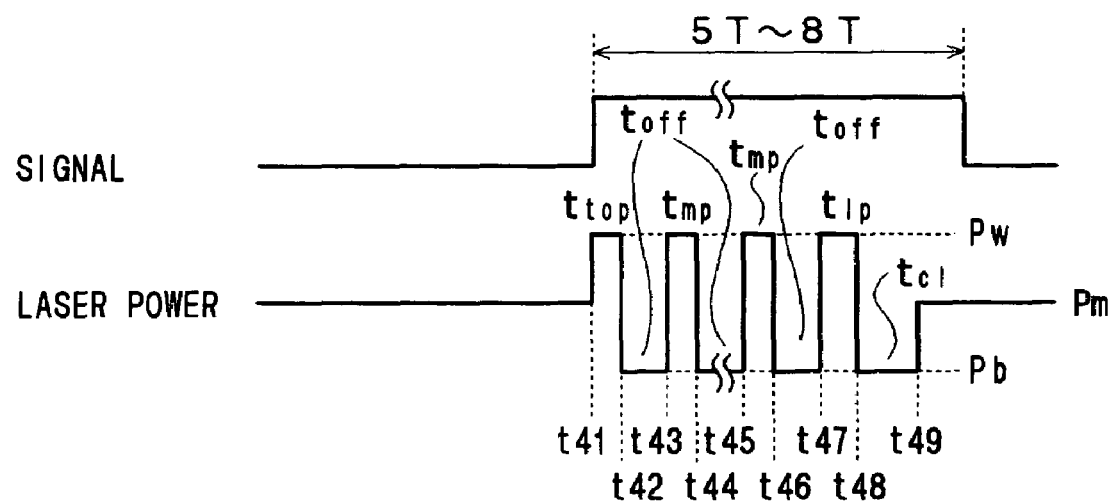
FIG. 10 is a diagram showing the waveform of a pulse pattern for modulating the power of a laser beam in the case of recording one among a 5T signal to an 8T signal in an L0 information recording layer or an L1 information recording layer of an optical recording medium.

Each of FIGS. 7 to 10 is a diagram showing the waveform of a pulse pattern for modulating the power of the laser beam L in the case of recording data in the L0 information recording layer 20 or the L1 information recording layer 30 of the optical recording medium 10, where FIG. 7 shows a pulse pattern used in the case of recording a 2T signal, FIG. 8 shows a pulse pattern used in the case of recording a 3T signal, FIG. 9 shows a pulse pattern used in the case of recording a 4T signal and FIG. 10 shows random signals used in the case of recording one among a 5T signal to an 8T signal.

As shown in FIGS. 7 to 10, the power of the laser beam L is modulated between three levels, a recording power Pw, an intermediate power Pm and a bottom power Pb where Pw>Pm>Pb.

The recording power Pw is set to such a high level that Si contained in the first L0 recording film 23a as a primary component and Cu contained in the second L0 recording film 23b as a primary component can be heated and mixed to form a record mark M when the laser beam L whose power is set to the recording power Pw is projected onto the L0 information recording layer 20 and that Si contained in the first L1 recording film 33a as a primary component and Cu contained in the second L1 recording film 33b as a primary component can be heated and mixed to form a record mark M when the laser beam L whose power is set to the recording power Pw is projected onto the L1 information recording layer 30. On the other hand, the intermediate power Pm and the bottom power Pb are set to such low levels that Si contained in the first L0 recording film 23a as a primary component and Cu contained in the second L0 recording film 23b as a primary component cannot be substantially mixed when the laser beam L whose power is set to the intermediate power Pm or the bottom power Pb is projected onto the L0 information recording layer 20 and that Si contained in the first L1 recording film 33a as a primary component and Cu contained in the second L1 recording film 33b as a primary component cannot be substantially mixed when the laser beam L whose power is set to the intermediate power Pm or the bottom power Pb is projected onto the L1 information recording layer 30. In particular, the bottom power Pb is set to such an extremely low level that regions of the first L0 recording film 23a and the second L0 recording film 23b or the first L1 recording film 33a and the second L1 recording film 33b heated by irradiation with the laser beam L whose power is set to the recording power Pw can be cooled by irradiation with the laser beam L whose power is set to the bottom power Pb.

As shown in FIG. 7, in the case of recording a 2T signal in the L0 information recording layer 20 or the L1 information recording layer 30 of the optical recording medium 10, the power of the laser beam L is modulated so that it is increased from the intermediate power Pm to the recording power Pw at a time t11, decreased from the recording power Pw to the bottom power Pb at a time t12 after passage of a predetermined time period $t_{top}$, and increased from the bottom power Pb to the intermediate power Pm at a time t13 after passage of a predetermined cooling time period $t_{cl}$.

Therefore, in the case of recording a 2T signal in the L0 information recording layer 20 or the L1 information recording layer 30 of the optical recording medium 10, the number of pulses having a level equal to the recording power Pw is set to be 1.

On the other hand, as shown in FIG. 8, in the case of recording a 3T signal in the L0 information recording layer 20 or the L1 information recording layer 30 of the optical recording medium 10, the power of the laser beam L is modulated so that it is increased from the intermediate power Pm to the recording power Pw at a time t21, decreased from the recording power Pw to the bottom power Pb at a time t22 after passage of a predetermined time period $t_{top}$, increased from the bottom power Pb to the recording power Pw at a time t23 after passage of a predetermined time period $t_{off}$, decreased from the recording power Pw to the bottom power Pb at a time t24 after passage of a predetermined time period $t_{lp}$, and increased from the bottom power Pb to the intermediate power Pm at a time t25 after passage of a predetermined cooling time period $t_{cl}$.

Therefore, in the case of recording a 3T signal in the L0 information recording layer 20 or the L1 information recording layer 30 of the optical recording medium 10, the number of pulses each having a level equal to the recording power Pw is set to be 2.

Further, as shown in FIG. 9, in the case of recording a 4T signal in the L0 information recording layer 20 or the L1 information recording layer 30 of the optical recording medium 10, the power of the laser beam L is modulated so that it is increased from the intermediate power Pm to the recording power Pw at a time t31, decreased from the recording power Pw to the bottom power Pb at a time t32 after passage of a predetermined time period $t_{top}$, increased from the bottom power Pb to the recording power Pw at a time t33 after passage of a predetermined time period $t_{off}$, decreased from the recording power Pw to the bottom power Pb at a time t34 after passage of a predetermined time period $t_{mp}$, increased from the bottom power Pb to the recording power Pw at a time t35 after passage of a predetermined time period $t_{off}$, decreased from the recording power Pw to the bottom power Pb at a time t36 after passage of a predetermined time period $t_{lp}$, and increased from the bottom power Pb to the intermediate power Pm at a time t37 after passage of a predetermined cooling time period $t_{cl}$.

Therefore, in the case of recording a 4T signal in the L0 information recording layer 20 or the L1 information recording layer 30 of the optical recording medium 10, the number of pulses each having a level equal to the recording power Pw is set to be 3.

Moreover, as shown in FIG. 10, in the case of recording one among a 5T signal to a 8T signal in the L0 information recording layer 20 or the L1 information recording layer 30 of the optical recording medium 10, the power of the laser beam L is modulated so that it is increased from the intermediate power Pm to the recording power Pw at a time t41, held at the recording power Pw during the time period $t_{top}$, the time periods $t_{mp}$ and the time period $t_{lp}$, held at the bottom power Pb during the time periods $t_{off}$ and the cooling time period $t_{cl}$ and increased from the bottom power Pb to the intermediate power Pm at a time t49 after passage of the cooling time period $t_{cl}$.

Therefore, in the case of recording one among a 5T signal to a 8T signal in the L0 information recording layer 20 or the L1 information recording layer 30 of the optical recording medium 10, the number of pulses each having a level equal to the recording power Pw is set to be 4 to 7.

The pulse pattern shown in FIGS. 7 to 10 is particularly preferably used for recording data in the L1 information recording layer 30 of the optical recording layer 30.

More specifically, in the case where data are recorded in the L1 information recording layer 30 of the optical recording medium 10 by modulating the power of a laser beam L using a pulse pattern shown in FIGS. 7 to 10, since the power of the laser beam L is modulated to the bottom power Pb immediately after being set to the recording power Pw, even when data are recorded in the L1 information recording layer 30 provided with no reflective film, it is possible to prevent excessive heat from being accumulated in the L1 information recording layer 30 and it is therefore possible to prevent the degradation of characteristics of signals obtained by reproducing data recorded in the L1 information recording layer 30 caused by heat generated in the first L1 recording film 33a and the second L1 recording film 33b even though the L1 information recording layer 30 includes no reflective film.

According to this embodiment, since the thickness of each of the second dielectric film 32 and the first dielectric film 34 is set so that the dependency X of light transmittance of the L1 information recording layer 30 on the wavelength of the laser beam L locally becomes minimal, it is possible to minimize the dependency X of light transmittance of the L1 information recording layer 30 on the wavelength of the laser beam L.

Further, according to this embodiment, since the second dielectric film 32 disposed on the side of the support substrate 11 is formed so as to have a thickness substantially equal to a second smallest thickness D2 thicker than the thickness D1 among thicknesses at which the dependency X of light transmittance of the L1 information recording layer 30 on the wavelength of the laser beam L locally becomes minimal, the dependency X of light transmittance of the L1 information recording layer 30 on the wavelength of the laser beam L can be minimized and it is further possible to effectively prevent the recording layer 33 of the L1 information recording layer 30 from being corroded by water passing through the support substrate 11 and effectively prevent cracks from being generated in the second dielectric film 32.

Moreover, according to this embodiment, since the first dielectric film 34 disposed on the side of the light incidence plane 13a is formed so as to have a thickness substantially equal to the smallest thickness among thicknesses at which the dependency of light transmittance of the L1 information recording layer 30 on the wavelength of the laser beam locally becomes minimal, the dependency X of light transmittance of the L1 information recording layer 30 on the wavelength of the laser beam L can be minimized and it is further possible to sufficiently increase the light transmittance of the L1 information recording layer 30 and improve the optical characteristics of the optical recording medium 10.

WORKING EXAMPLES AND COMPARATIVE EXAMPLES

Hereinafter, working examples will be set out in order to further clarify the advantages of the present invention.

Working Example 1

An optical recording medium sample #1-1 was fabricated in the following manner.

A disk-like polycarbonate substrate having a thickness of 1.1 mm and a diameter of 120 mm and formed with grooves and lands on the surface thereof was first fabricated by an injection molding process.

Then, the polycarbonate substrate was set on a sputtering apparatus and a second dielectric film containing a mixture of ZnS and $SiO_2$ and having a thickness of 5 nm, a second recording film containing Cu as a primary component and 23 atomic % of Al and 13 atomic % of Au as an additive and having a thickness of 5 nm, a first recording film containing Si as a primary component and having a thickness of 4 nm and a first dielectric film containing $TiO_2$ and having a thickness of 30 nm were sequentially formed on the surface of the polycarbonate substrate on which the grooves and lands were formed, using the sputtering process, thereby forming an information recording layer on the surface of the polycarbonate substrate.

The mole ratio of ZnS to $SiO_2$ in the mixture of ZnS and $SiO_2$ contained in the second dielectric film was 80:20.

Further, the polycarbonate substrate formed with the information recording layer on the surface thereof was set on a spin coating apparatus and the first dielectric layer was coated using the spin coating method with a resin solution prepared by dissolving acrylic ultraviolet ray curable resin in a solvent to form a coating layer and the coating layer was irradiated with ultraviolet rays, thereby curing the acrylic ultraviolet ray curable resin to form a light transmission layer having a thickness of 100 μm.

Thus, the optical recording medium sample #1-1 was fabricated.

Further, optical recording medium samples #1-2 to #1-17 were fabricated in the manner of fabricating the optical recording medium sample #1-1 except that the thickness of a second dielectric film was gradually increased in successive samples up to 240 nm in recording medium sample #1-17.

Then, light transmittance T0 of the information recording layer of each of the optical recording medium samples #1-1 to #1-17 with respect to a laser beam having a wavelength of 405 nm, light transmittance T1 thereof with respect to a laser beam having a wavelength of 385 nm and light transmittance T2 thereof with respect to a laser beam having a wavelength of 425 nm were measured and the wavelength dependency X of light transmittance of the information recording layer of each optical recording medium sample was calculated in accordance with the following formula, thereby measuring how the wavelength dependency X of light transmittance of the information recording layer varied with the thickness of the second dielectric film.

$X=|T1-T2|/T0$

Figure 11:
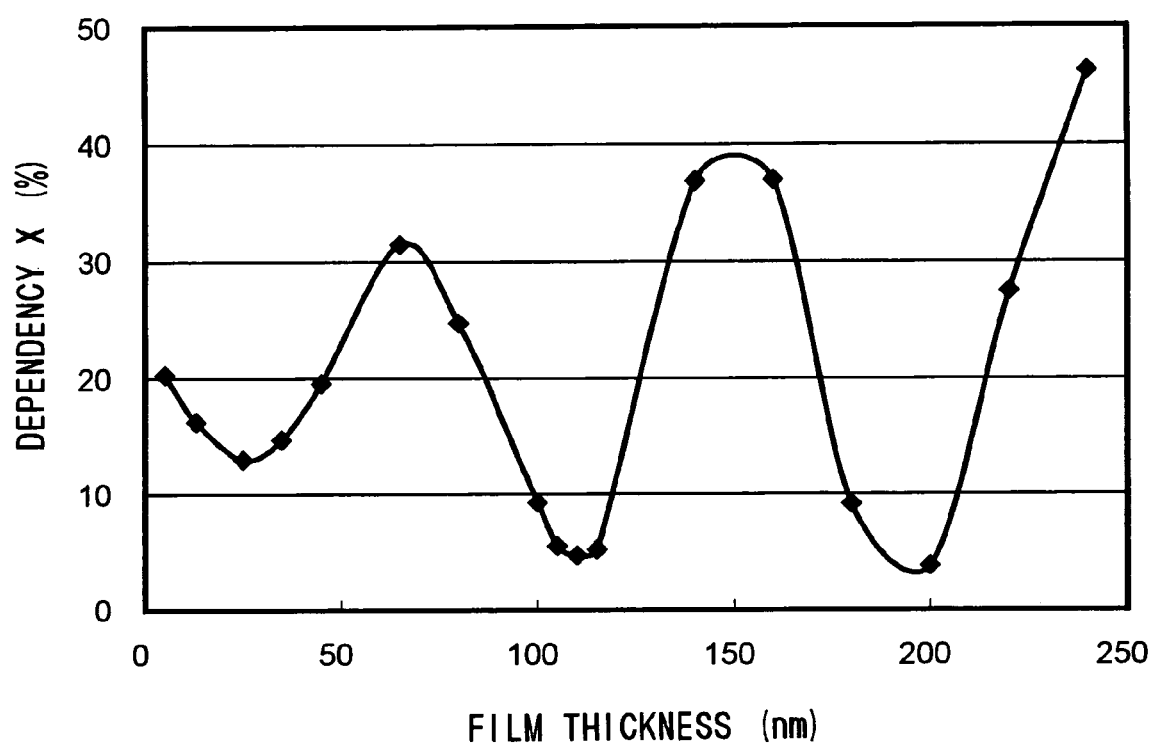
FIG. 11 is a graph showing how the dependency X of light transmittance of an information recording layer of an optical recording medium sample fabricated in Working Example 1 on the wavelength of a laser beam varied with the thickness of a second dielectric film.

The results of the measurement are shown in FIG. 11.

As shown in FIG. 11, it was found that the wavelength dependency X of light transmittance of the information recording layer assumed a first local minimal value X1 when the thickness of the second dielectric film was equal to about 25 nm, assumed a second local minimal value X2 when the thickness of the second dielectric film was equal to about 110 nm and assumed a third local minimal value X3 when the thickness of the second dielectric film was equal to about 200 nm.

It was further found that the first local minimal value X1 was about 13%, the second local minimal value X2 was about 5% and the third local minimal value X3 was about 4%.

Working Example 2

An optical recording medium sample #2-1 was fabricated in the manner of fabricating the optical recording medium sample #1-1 except that a second recording film containing Ti as a primary component and 43 atomic % of Al as an additive was formed.

Further, optical recording medium samples #2-2 to #2-15 were fabricated in the manner of fabricating the optical recording medium sample #2-1 except that the thickness of a second dielectric film was gradually increased in successive samples up to 240 nm.

Then, light transmittance T0 of the information recording layer of each of the optical recording medium samples #2-1 to #2-15 with respect to a laser beam having a wavelength of 405 nm, light transmittance T1 thereof with respect to a laser beam having a wavelength of 385 nm and light transmittance T2 thereof with respect to a laser beam having a wavelength of 425 nm were measured and the wavelength dependency X of light transmittance of the information recording layer of each optical recording medium sample was calculated, thereby measuring how the wavelength dependency X of light transmittance of the information recording layer varied with the thickness of the second dielectric film.

Figure 12:
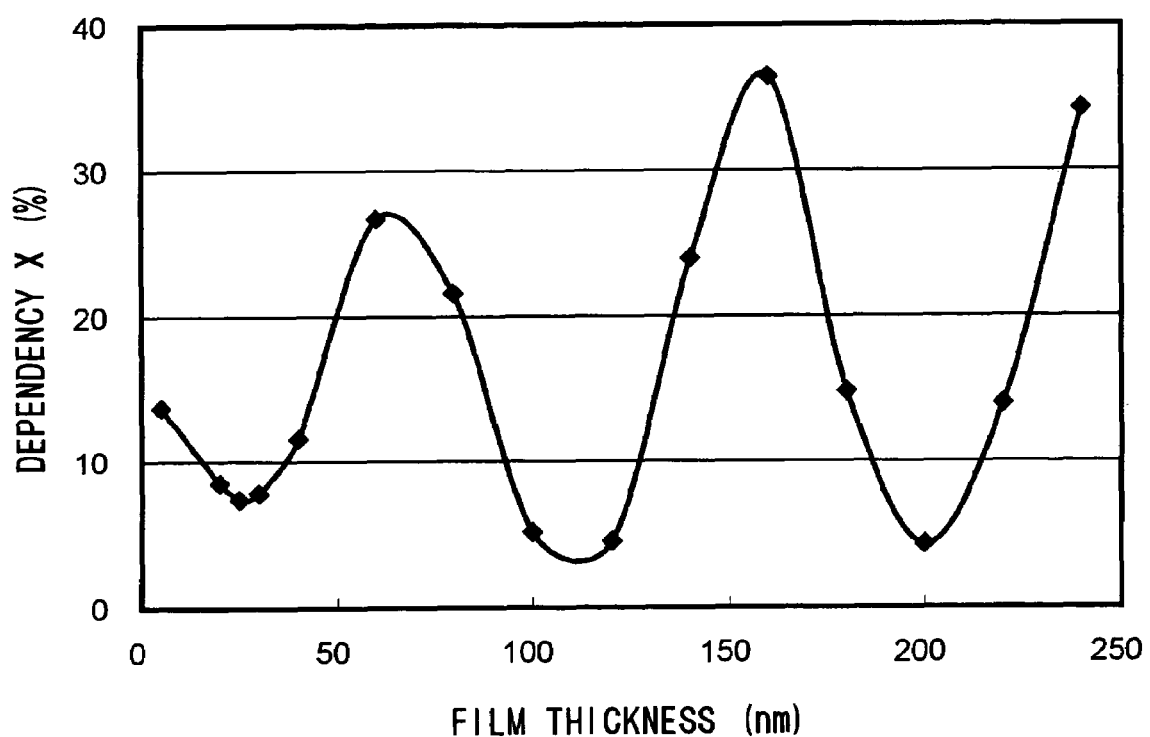
FIG. 12 is a graph showing how the dependency X of light transmittance of an information recording layer of an optical recording medium sample fabricated in Working Example 2 on the wavelength of a laser beam varied with the thickness of a second dielectric film.

The results of the measurement are shown in FIG. 12.

As shown in FIG. 12, it was found that the wavelength dependency X of light transmittance of the information recording layer assumed a first local minimal value X1 when the thickness of the second dielectric film was equal to about 25 nm, assumed a second local minimal value X2 when the thickness of the second dielectric film was equal to about 120 nm and assumed a third local minimal value X3 when the thickness of the second dielectric film was equal to about 200 nm.

It was further found that the first local minimal value X1 was about 7%, the second local minimal value X2 was about 5% and the third local minimal value X3 was about 4%.

Working Example 3

An optical recording medium sample #3-1 was fabricated in the manner of fabricating the optical recording medium sample #1-1 except that a second dielectric film was formed so as to have a thickness of 25 nm and a first dielectric film was formed of a mixture of ZnS and $SiO_2$.

The mole ratio of ZnS to $SiO_2$ in the mixture of ZnS and $SiO_2$ contained in the first dielectric film was 80:20.

Further, optical recording medium samples #3-2 to #3-14 were fabricated in the manner of fabricating the optical recording medium sample #3-1 except that the thickness of the first dielectric film was gradually increased in successive samples up to 240 nm.

Then, light transmittance T0 of the information recording layer of each of the optical recording medium samples #3-1 to #3-14 with respect to a laser beam having a wavelength of 405 nm, light transmittance T1 thereof with respect to a laser beam having a wavelength of 385 nm and light transmittance T2 thereof with respect to a laser beam having a wavelength of 425 nm were measured and the wavelength dependency X of light transmittance of the information recording layer of each optical recording medium sample was calculated, thereby measuring how the wavelength dependency X of light transmittance of the information recording layer varied with the thickness of the first dielectric film.

Figure 13:
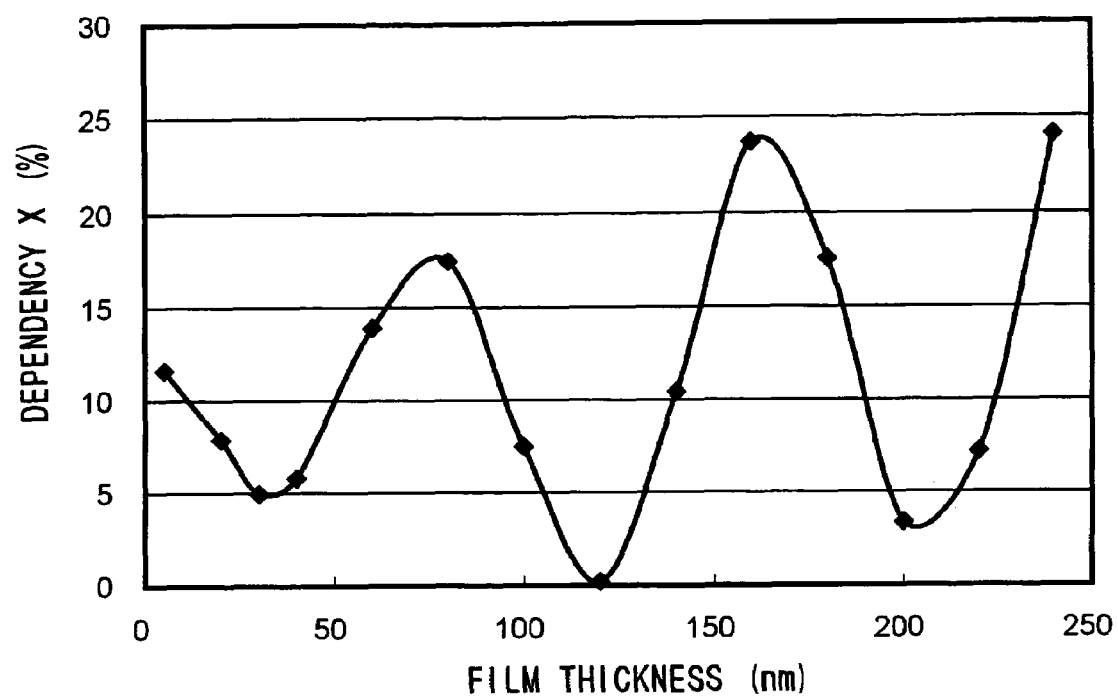
FIG. 13 is a graph showing how the dependency X of light transmittance of an information recording layer of an optical recording medium sample fabricated in Working Example 3 on the wavelength of a laser beam varied with the thickness of a first dielectric film.

The results of the measurement are shown in FIG. 13.

As shown in FIG. 13, it was found that the wavelength dependency X of light transmittance of the information recording layer assumed a first local minimal value X1 when the thickness of the first dielectric film was equal to about 30 nm, assumed a second local minimal value X2 when the thickness of the first dielectric film was equal to about 120 nm and assumed a third local minimal value X3 when the thickness of the first dielectric film was equal to about 200 nm.

It was further found that the first local minimal value X1 was about 5%, the second local minimal value X2 was about 0% and the third local minimal value X3 was about 3%.

Working Example 4

An optical recording medium sample #4-1 was fabricated in the manner of fabricating the optical recording medium sample #1-1 except that a second dielectric film was formed of $TiO_2$ so as to have a thickness of 10 nm.

Further, optical recording medium samples #4-2 to #4-12 were fabricated in the manner of fabricating the optical recording medium sample #4-1 except that the thickness of a second dielectric film was gradually increased in successive samples up to 180 nm.

Then, light transmittance T0 of the information recording layer of each of the optical recording medium samples #4-1 to #4-12 with respect to a laser beam having a wavelength of 405 nm, light transmittance T1 thereof with respect to a laser beam having a wavelength of 385 nm and light transmittance T2 thereof with respect to a laser beam having a wavelength of 425 nm were measured and the wavelength dependency X of light transmittance of the information recording layer of each optical recording medium sample was calculated, thereby measuring how the wavelength dependency X of light transmittance of the information recording layer varied with the thickness of the second dielectric film.

Figure 14:
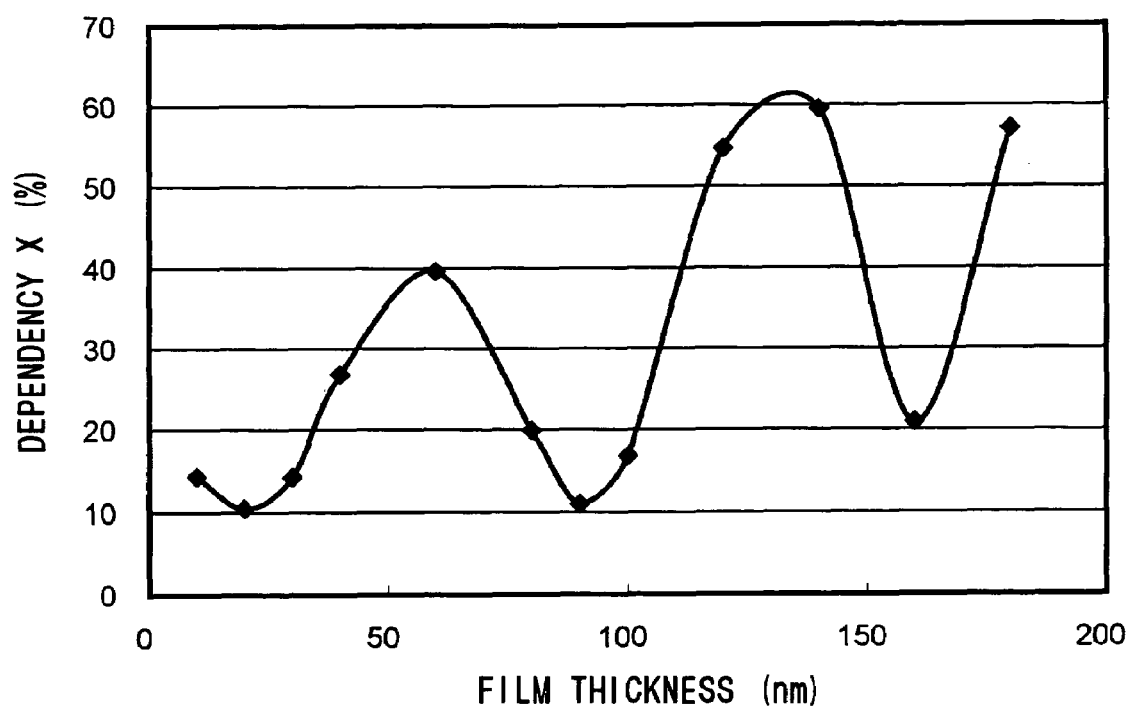
FIG. 14 is a graph showing how the dependency X of light transmittance of an information recording layer of an optical recording medium sample fabricated in Working Example 4 on the wavelength of a laser beam varied with the thickness of a second dielectric film.

The results of the measurement are shown in FIG. 14.

As shown in FIG. 14, it was found that the wavelength dependency X of light transmittance of the information recording layer assumed a first local minimal value X1 when the thickness of the second dielectric film was equal to about 25 nm, assumed a second local minimal value X2 when the thickness of the second dielectric film was equal to about 90 nm and assumed a third local minimal value X3 when the thickness of the second dielectric film was equal to about 160 nm.

It was further found that the first local minimal value X1 was about 11%, the second local minimal value X2 was about 11% and the third local minimal value X3 was about 21%.

Working Example 5

An optical recording medium sample #5-1 was fabricated in the manner of fabricating the optical recording medium sample #3-1 except that a second dielectric film was formed of $TiO_2$ so as to have a thickness of 5 nm.

Further, optical recording medium samples #5-2 to #5-14 were fabricated in the manner of fabricating the optical recording medium sample #5-1 except that the thickness of the first dielectric film was gradually increased in successive samples up to 180 nm.

Then, light transmittance T0 of the information recording layer of each of the optical recording medium samples #5-1 to #5-14 with respect to a laser beam having a wavelength of 405 nm, light transmittance T1 thereof with respect to a laser beam having a wavelength of 385 nm and light transmittance T2 thereof with respect to a laser beam having a wavelength of 425 nm were measured and the wavelength dependency X of light transmittance of the information recording layer of each optical recording medium sample was calculated, thereby measuring how the wavelength dependency X of light transmittance of the information recording layer varied with the thickness of the first dielectric film.

Figure 15:
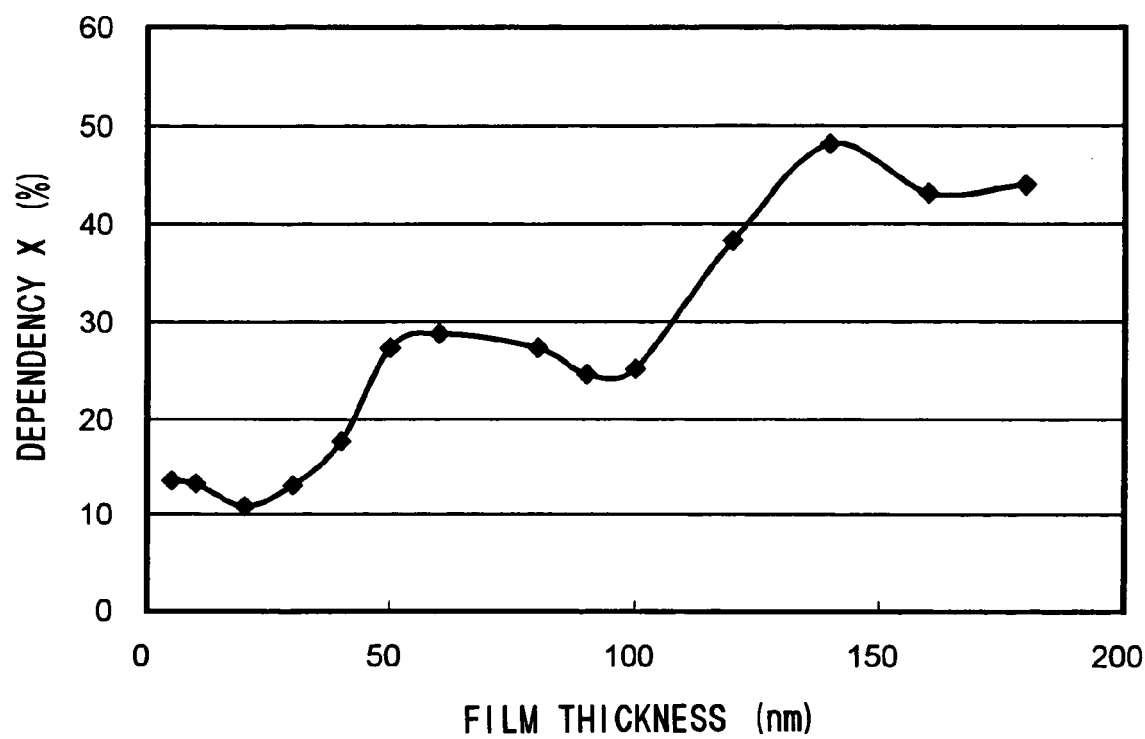
FIG. 15 is a graph showing how the dependency X of light transmittance of an information recording layer of an optical recording medium sample fabricated in Working Example 5 on the wavelength of a laser beam varied with the thickness of a first dielectric film.

The results of the measurement are shown in FIG. 15.

As shown in FIG. 15, it was found that the wavelength dependency X of light transmittance of the information recording layer assumed a first local minimal value X1 when the thickness of the first dielectric film was equal to about 30 nm, assumed a second local minimal value X2 when the thickness of the first dielectric film was equal to about 90 nm and assumed a third local minimal value X3 when the thickness of the first dielectric film was equal to about 160 nm.

It was further found that the first local minimal value X1 was about 11%, the second local minimal value X2 was about 25% and the third local minimal value X3 was about 43%.

The present invention has thus been shown and described with reference to specific embodiments and working examples. However, it should be noted that the present invention is in no way limited to the details of the described arrangements but changes and modifications may be made without departing from the scope of the appended claims.

For example, although in the above embodiments, the optical recording medium 10 includes the L0 information recording layer 20 and the L1 information recording layer 30 as information recording layers, it is not absolutely necessary for the optical recording medium 10 to include the L0 information recording layer 20 and the L1 information recording layer 30 as information recording layers and the optical recording medium may include three or more information recording layers.

Further, in the above described embodiment, although the first dielectric film 34 is formed of $TiO_2$ and the second dielectric film 32 is formed of a mixture of ZnS and $SiO_2$, it is not absolutely necessary to form the first dielectric film 34 of $TiO_2$ and the second dielectric film 32 of the mixture of ZnS and $SiO_2$ and the first dielectric film 34 and the second dielectric film 32 may be formed of the same material.

Furthermore, in the above described embodiment, the second dielectric film 32 is formed so as to have a thickness substantially equal to a second smallest thickness D2 among thicknesses at which the dependency of light transmittance of the L1 information recording layer on the wavelength of the laser beam locally becomes minimal and the first dielectric film 34 is formed so as to have a thickness substantially equal to the smallest thickness among thicknesses at which the dependency of light transmittance of the L1 information recording layer 30 on the wavelength of the laser beam locally becomes minimal. However, it is not absolutely necessary to form the second dielectric film 32 so as to have a thickness substantially equal to a second smallest thickness D2 among thicknesses at which the dependency of light transmittance of the L1 information recording layer 30 on the wavelength of the laser beam locally becomes minimal and the first dielectric film 34 so as to have a thickness substantially equal to the smallest thickness among thicknesses at which the dependency of light transmittance of the L1 information recording layer 30 on the wavelength of the laser beam locally becomes minimal. Specifically, the thickness of the first dielectric film 34 can be determined as a value close to one of the thicknesses at which the dependency of light transmittance of the L1 information recording layer 30 on the wavelength of the laser beam locally becomes minimal and the thickness of the second dielectric film 32 may be determined as a value close to one of the thicknesses at which the dependency of light transmittance of the L1 information recording layer 30 on the wavelength of the laser beam locally becomes minimal.

Moreover, in the above described embodiment, although the L0 information recording layer 20 includes the first L0 recording film 23a and the second L0 recording film 23b, it is not absolutely necessary for the L0 information recording layer 20 to include the first L0 recording film 23a and the second L0 recording film 23b and the recording layer 23 of the L0 information recording layer 20 may be constituted as a single recording layer formed of Sn, Ti or the like. Furthermore, instead of the first recording layer 23, the support substrate 11 or the transparent intermediate layer 12 can be utilized as a recording layer adapted to enable only data reading by forming pits on the surface of the support substrate 11 or the transparent intermediate layer 12 and recording data therein.

Furthermore, in the above described embodiment, although the first L1 recording film 33a and the second L1 recording film 33b of the L1 information recording layer 30 are formed in contact with each other it is not absolutely necessary to form the first recording film 33a and the second recording film 33b of the L1 information recording layer 30 in contact with each other but it is sufficient for the second recording film 33b to be so located in the vicinity of the first recording film 33a as to enable formation of a mixed region including the primary component element of the first recording film 33a and the primary component element of the second recording film 33b when the region is irradiated with a laser beam. Further, one or more other films such as a dielectric film may be interposed between the first recording film 33a and the second recording film 33b.

Further, in the above described embodiment, although the L1 information recording layer 30 includes the first L1 recording film 33a containing Si as a primary component and the second L1 recording film 33b containing Cu as a primary component, it is sufficient for the first L1 recording film 33a to contain one element selected from the group consisting of Si, Ge, Sn, Mg, In, Zn, Bi and Al as a primary component and for the second L1 recording film 33b to contain one element selected from the group consisting of Cu, Al, Zn, Ti and Ag and different from the element contained in the first L1 recording film 23a as a primary component and it is not absolutely necessary for the recording layer 33 of the L1 information recording layer 30 to include the first L1 recording film 33a containing Si as a primary component and the second L1 recording film 33b containing Cu as a primary component.

Furthermore, although in the above described embodiments, the L1 information recording layer 30 includes the first L1 recording film 33a containing Si as a primary component and the second L1 recording film 33b containing Cu as a primary component, the recording layer 33 of the L1 information recording layer 30 may be constituted as a single recording layer formed of Sn, Ti or the like.

Moreover, although in the above described embodiments, the L1 information recording layer 30 includes no reflective film, the L1 information recording layer 30 may include a thin reflective film.

Further, although in the above described embodiments, the optical recording medium 10 includes the light transmission layer 13 and is constituted so that a laser beam L is projected onto the L1 information recording layer 30 or the L0 information recording layer 20 via the light transmission layer 13, the present invention is not limited to an optical recording medium having such a configuration and the optical recording medium may include a substrate formed of a light transmittable material and be constituted so that a laser beam L is projected onto the L1 information recording layer 30 or the L0 information recording layer 20 via the substrate.

According to the present invention, it is possible to provide an optical recording medium which includes a plurality of information recording layers and in which the dependency of light transmittance of at least one information recording layer other than an information recording layer farthest from a light incidence plane through which a laser beam is projected on the wavelength of the laser beam can be markedly reduced.

Further, according to the present invention, it is possible to provide an optical recording medium which includes a plurality of information recording layers and in which a recording layer included in at least one information recording layer other than an information recording layer farthest from the light incidence plane can be effectively prevented from being corroded by water passing through a support substrate and cracks can be effectively prevented from being generated in a dielectric film adjacent with the recording layer.

The invention claimed is:

1. An optical recording medium comprising a support substrate and a plurality of information recording layers, at least one information recording layer other than an information recording layer farthest from a light incidence plane through which a laser beam is projected being constituted so as to be irreversibly changed when the laser beam is projected thereonto and comprising a first dielectric film, a second dielectric film and a recording layer disposed between the first dielectric film and the second dielectric film and a thickness of at least one of the first dielectric film and the second dielectric film being determined so as to be equal to or larger than D21 and equal to or smaller than D22, where D21 is smaller than D2, D22 is larger than D2, D2 is a second smallest thickness among a plurality of thicknesses at which the dependency X of light transmittance of the at least one information recording layer other than the information recording layer farthest from the light incidence plane on the wavelength of a laser beam locally becomes minimal, and D21 and D22 are determined in such a manner that the dependency X of light transmittance of the information recording layer other than the information recording layer farthest from the light incidence plane on the wavelength of a laser beam is smaller than 1.2·X2 when at least one of the first dielectric film and the second dielectric film has a thickness of D21 to D22, where X2 is the wavelength dependency corresponding to the second smallest thickness D2.

2. An optical recording medium in accordance with claim 1, wherein the laser beam has a wavelength of 380 nm to 450 nm.

3. An optical recording medium in accordance with claim 1, wherein the at least one of the first dielectric film and the second dielectric film is formed of a mixture of ZnS and $SiO_2$.

4. An optical recording medium in accordance with claim 2, wherein the at least one of the first dielectric film and the second dielectric film is formed of a mixture of ZnS and $SiO_2$.

5. An optical recording medium in accordance with claim 3, wherein the light incidence plane is disposed on the side opposite to the support substrate with respect to the plurality of information recording layers, the first dielectric film is disposed on the side of the light incidence plane with respect to the recording layer and is formed of $TiO_2$, and the second dielectric film is disposed on the side of the support substrate and is formed of a mixture of ZnS and $SiO_2$.

6. An optical recording medium in accordance with claim 4, wherein the light incidence plane is disposed on the side opposite to the support substrate with respect to the plurality of information recording layers, the first dielectric film is disposed on the side of the light incidence plane with respect to the recording layer and is formed of $TiO_2$, and the second dielectric film is disposed on the side of the support substrate and is formed of a mixture of ZnS and $SiO_2$.

7. An optical recording medium in accordance with claim 1, wherein the recording layer is constituted by a first recording film containing one element selected from the group consisting of Si, Ge, Sn, Mg, In, Zn, Bi and Al as a primary component and a second recording film containing one element selected from the group consisting of Cu, Al, Zn, Ti and Ag and different from the element contained in the first recording film as a primary component.

8. An optical recording medium in accordance with claim 2, wherein the recording layer is constituted by a first recording film containing one element selected from the group consisting of Si, Ge, Sn, Mg, In, Zn, Bi and Al as a primary component and a second recording film containing one element selected from the group consisting of Cu, Al, Zn, Ti and Ag and different from the element contained in the first recording film as a primary component.

9. An optical recording medium in accordance with claim 3, wherein the recording layer is constituted by a first recording film containing one element selected from the group consisting of Si, Ge, Sn, Mg, In, Zn, Bi and Al as a primary component and a second recording film containing one element selected from the group consisting of Cu, Al, Zn, Ti and Ag and different from the element contained in the first recording film as a primary component.

10. An optical recording medium in accordance with claim 4, wherein the recording layer is constituted by a first recording film containing one element selected from the group consisting of Si, Ge, Sn, Mg, In, Zn, Bi and Al as a primary component and a second recording film containing one element selected from the group consisting of Cu, Al, Zn, Ti and Ag and different from the element contained in the first recording film as a primary component.

11. An optical recording medium in accordance with claim 5, wherein the recording layer is constituted by a first recording film containing one element selected from the group consisting of Si, Ge, Sn, Mg, In, Zn, Bi and Al as a primary component and a second recording film containing one element selected from the group consisting of Cu, Al, Zn, Ti and Ag and different from the element contained in the first recording film as a primary component.

12. An optical recording medium in accordance with claim 6, wherein the recording layer is constituted by a first recording film containing one element selected from the group consisting of Si, Ge, Sn, Mg, In, Zn, Bi and Al as a primary component and a second recording film containing one element selected from the group consisting of Cu, Al, Zn, Ti and Ag and different from the element contained in the first recording film as a primary component.

13. An optical recording medium in accordance with claim 7, wherein the first recording film contains Si as a primary component and the second recording film contains Cu as a primary component.

14. An optical recording medium in accordance with claim 8, wherein the first recording film contains Si as a primary component and the second recording film contains Cu as a primary component.

15. An optical recording medium in accordance with claim 9, wherein the first recording film contains Si as a primary component and the second recording film contains Cu as a primary component.

16. An optical recording medium in accordance with claim 10, wherein the first recording film contains Si as a primary component and the second recording film contains Cu as a primary component.

17. An optical recording medium in accordance with claim 11, wherein the first recording film contains Si as a primary component and the second recording film contains Cu as a primary component.

18. An optical recording medium in accordance with claim 12, wherein the first recording film contains Si as a primary component and the second recording film contains Cu as a primary component.

19. An optical recording medium comprising a support substrate and a plurality of information recording layers, at least one information recording layer other than an information recording layer farthest from a light incidence plane through which a laser beam is projected structured to be irreversibly changeable when the laser beam is projected therethrough and comprising a first dielectric film, a second dielectric film and a recording layer disposed between the first dielectric film and the second dielectric film, and at least one of the first dielectric film and the second dielectric film being formed of a mixture of ZnS and $SiO_2$ so as to have a thickness of 100 nm to 130 nm.

* * * * *